(12) United States Patent
Ananya

(10) Patent No.: US 6,441,823 B1
(45) Date of Patent: Aug. 27, 2002

(54) COMPUTER CURVE CONSTRUCTION SYSTEM

(76) Inventor: Brigit Ananya, 20725 Locust Dr., Los Gatos, CA (US) 95033

(*) Notice: Subject to any disclaimer, the term of this patent is extended or adjusted under 35 U.S.C. 154(b) by 0 days.

(21) Appl. No.: 09/405,713

(22) Filed: Sep. 24, 1999

Related U.S. Application Data

(60) Provisional application No. 60/102,523, filed on Sep. 30, 1998, and provisional application No. 60/101,927, filed on Sep. 24, 1998.

(51) Int. Cl.$^7$ .............................................. G06T 11/20
(52) U.S. Cl. ....................................................... 345/442
(58) Field of Search ........................................ 345/442

(56) References Cited

U.S. PATENT DOCUMENTS

| | | | |
|---|---|---|---|
| 4,961,150 A | * | 10/1990 | Seki et al. |
| 5,412,770 A | | 5/1995 | Yamashita et al. .......... 395/142 |
| 5,594,852 A | | 1/1997 | Tankelevich ................ 395/141 |
| 5,636,338 A | | 6/1997 | Moreton ..................... 395/142 |

OTHER PUBLICATIONS

Carl de Boor et al., Computer Aided Geometric Design, (1987) vol. 4, No. 4, pp. 269–278.
Wolfgang Boehm, Computer Graphics and Image Processing, (1982) vol. 19, No. 3, pp 201–226.
A.R. Forrest, Computer Aided Design, (1980) vol. 12, No. 4, pp. 165–172.
Reinhold Kass, Computer Aided Design, (1983) vol. 15, No. 5, pp. 297–299.
Helmut Pottmann, ACM Transactions on Graphics, (1991) vol. 10, No. 4, 366–377.
J. Hoschek, Computer Aided Design, (1992), vol. 24, No. 11, pp. 611–618.
A.R. Forrest, Computer Aided Design, (1990), vol. 22, No. 9, pp. 527–537.
L. Piegl, IEEE Computer Graphics and Applications, (1987), vol. 7, No. 4, pp. 45–58.

* cited by examiner

*Primary Examiner*—Jeffery Brier
(74) *Attorney, Agent, or Firm*—David E Newhouse, Esq.

(57) ABSTRACT

A fast computer curve construction system/method is described enabling a computer graphic artist, intuitively, to predictably, and accurately generate a class of two dimensional curves defined and described as peak-point curves, point-point curves point-tangent curves, point curves and curvature curves that can be connected together, and be connected with circular arcs and straight lines with either $G^0$ continuity, $G^1$ continuity, or $G^2$ continuity for display and printing.

The described computer curve construction system/method further permits the computer graphic artist to:

(i) dynamically modify or shape a constructed curve component by selecting and altering or repositioning particular geometric constraints defining that curve component;

(ii) modify the continuity of two connected curve components;

(iii) create two curve components from a single curve component;

(iv) create a single curve from of two curves;

(v) delete and redraw any curve component, and (vi) add or subtract curve components.

50 Claims, 14 Drawing Sheets

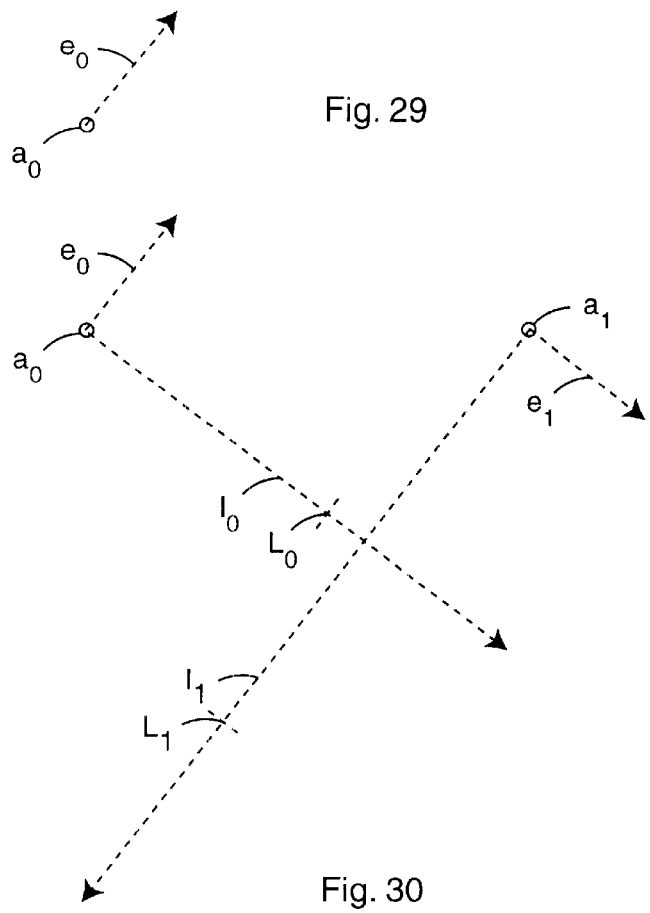
Fig. 29
Fig. 30
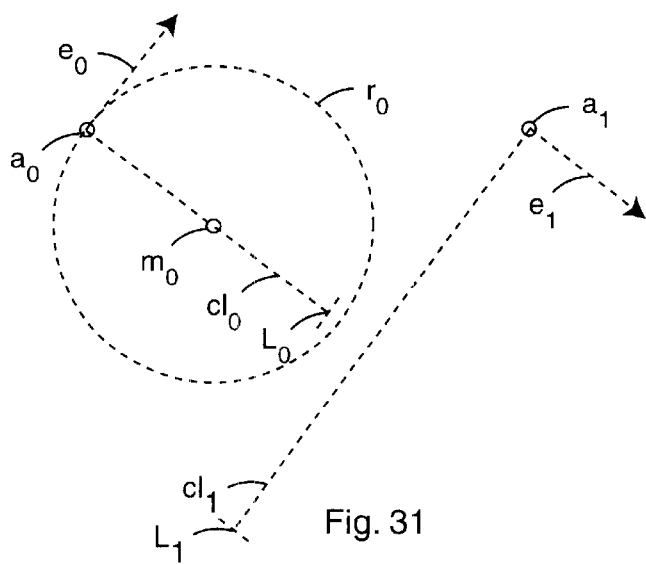
Fig. 31

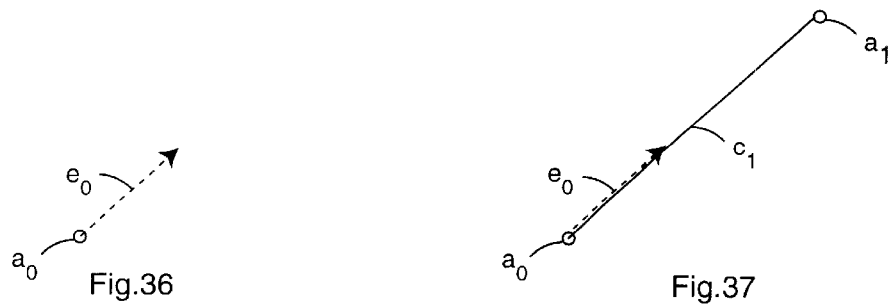
Fig.36
Fig.37
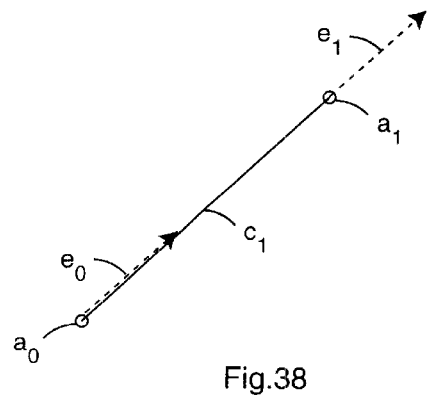
Fig.38
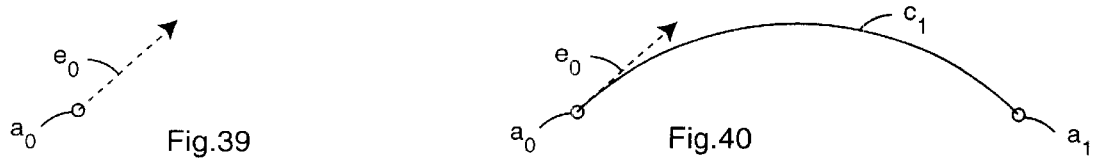
Fig.39    Fig.40
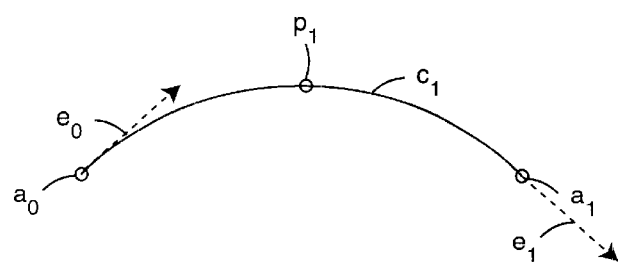
m1 —o— m2
Fig.41

COMPUTER CURVE CONSTRUCTION SYSTEM

RELATED APPLICATIONS

This application claims the benefit of U.S. Provisional Application No. 60/101,927, filed Sep. 24, 1998, by Brigit Ananya for Computer Curve Construction System, and of U.S. Provisional Application No. 60/102,523, filed Sep. 30, 1998, by Brigit Ananya for Computer Curve Construction System.

BACKGROUND OF THE INVENTION

1. Field Of The Invention

This invention relates generally to computer curve construction systems and methods.

2. Description of Related Art

A cubic Bezier curve is a mathematically defined curve. In a typical computer drawing program, it is drawn by setting four control points, i.e., by setting a start point $a_0$, a start tangent vector $v_0$, an end point $a_1$, and an end tangent vector $v_1$, as shown in FIG. 1. Additional Bezier curves (not shown) may be drawn, each connected to the end point of the previous Bezier curve, to create composite curves by setting additional points and tangent vectors. The length and direction of tangent vectors $v_0$ and $v_1$ are defined by setting their corresponding end points. The depth of the curve is determined by the lengths of tangent vectors $v_0$ and $v_1$, and the slope of the curve is determined by the angles of tangent vectors $v_0$ and $v_1$. Longer tangent vectors produce a curve with greater depth, and more angled tangent vectors produce a curve with greater slope. If at least one tangent vector is long enough, such as tangent vector $v_1'$ in FIG. 2, the beginning of the curve is positioned on the other side of tangent vector $v_0$, and an inflection point b is created at an unpredictable position. The curve is curved clockwise to the left of inflection point b, and counterclockwise to the right of inflection point b. Using the lengths of tangent vectors to determine the depth of a curve is unintuitive and unpredictable, so that the shape of the curve is difficult to control.

With a typical computer drawing program, to be able to trace a curve such as the curve shown in FIG. 4 it usually takes several iterations. FIG. 5 shows a first and second attempt (curves $c_1$ and $c_2$) to trace the curve trying to adjust the length of the end tangent vector, which never achieves the desired curve. FIG. 6 shows a third and fourth attempt (curves $c_3$ and $c_4$) first adjusting the length of the start tangent vector instead of the end tangent vector, and then again adjusting the length of the end tangent vector. The end result is still not quite satisfactory (the peak-point, as described later, is not in the right place, it is too much to the left). Some computer drawing programs allow adjusting a point of the curve at any particular parameter. With this kind of adjustment it is easier to achieve the desired curve than with adjusting the length of the tangent vectors. But it still takes several attempts, and it is not very intuitive, since the point does not have any geometric meaning (even if the original point selected is the peak point, as described later, it does not remain being the peak point, when it is adjusted). However, it is possible to trace the curve in one attempt by using the peak-point curve, which is described later.

In typical computer drawing program, when several Bezier curves are drawn as curve components of one composite curve, they sometimes are not connected very smooth such as the curve components $c_1$ and $c_2$ shown in FIG. 3, because they only connect with the continuity of points and tangent vectors. However, for curvature curves, which are described later, the curve components are connected very smooth such as the curve components $c_1$ and $c_2$ shown in FIG. 35, because they connect with the continuity of points, tangent directions and curvatures.

SUMMARY OF THE INVENTION

An object of the present computer curve construction system is to enable the construction of curves more intuitively, predictably, and accurately. Further objects of the present invention will become apparent from a consideration of the drawings and ensuing description. The computer curve construction allows constructing curves which consist of several curve components, which are connected either with $G^0$ continuity, i.e. continuity of points (geometric continuity of order 0), $G^1$ continuity, i.e. continuity of points and tangent directions, just the slopes of the tangents, not the lengths (geometric continuity of order 1), or $G^2$ continuity, i.e. continuity of points, tangent directions, and curvatures (geometric continuity of order 2).

For each curve component certain features are used for its construction. There are different types of curve components, which use different features for their construction. In a first embodiment, for a peak-point curve, the features are start and end points, start and end tangent directions, and a peak point that defines the greatest distance between the curve and the chord, i.e. the connecting line segment between the start and end point. In a second embodiment, for a point-point curve, the features are start and end points, start tangent direction, and a peak point. In a third embodiment, for a point-tangent curve, the features are start and end points, and start and end tangent directions. In a fourth embodiment, for a point curve, the features are start and end points, and a start tangent direction. In a fifth embodiment, for a curvature curve, the features are start and end points, start and end tangent directions, and start and end curvatures. In a sixth embodiment, for a circular arc, the features are start point, start tangent direction, and end point. In a seventh embodiment, for a straight line segment, the features are start point, start tangent direction, and end point.

During or after constructing a curve it is possible to modify the curve by changing the position of a feature of any curve component. In general (if the curve component is not a straight line segment) all features can be changed: the start and end points, the start and end tangent directions, the start and end curvatures, and the peak point. This means that not only the features that were used for the construction of the curve component can be changed, but also the other features, which were set automatically when the curve component was drawn so that they can be changed later. However there is one exception: if the curve component is connected with $G^2$ continuity at the start or end point, the peak point cannot be changed, because when a feature is changed, the types of continuity by which the curve component is connected at the start and end points remain the same.

It is also possible to modify the type of continuity by which two curve components are connected, or to make two curves out of one curve, or one curve out of two curves, to delete and redraw any curve component, or to add or subtract curve components.

This computer curve construction system enables the construction of curves more intuitively, predictably, and accurately, and it is also faster than the computer curve construction systems in typical computer drawing programs.

A better understanding of the features and advantages of the present invention will be obtained by reference to the following detailed description and accompanying drawings which set forth illustrative embodiments in which the principles of the invention are utilized.

BRIEF DESCRIPTION OF THE DRAWINGS

FIG. 29 is a first step in constructing a curvature curve.

FIG. 30 is a second step in constructing a curvature curve.

FIG. 31 is a third step in constructing a curvature curve.

FIG. 36 is a first step in constructing a straight line.

FIG. 37 is a second step in constructing a straight line.

FIG. 38 is a third step in constructing a straight line.

FIG. 39 is a first step in constructing a circle.

FIG. 40 is a second step in constructing a circle.

FIG. 41 is a third step in constructing a circle.

DETAILED DESCRIPTION OF THE INVENTION

Introduction

The present computer curve construction system and method is preferably implemented as part of a computer drawing program for drawing curves, which is a practical application in the industrial art of computer drawing. In one embodiment, the system may be implemented in any suitable computer language for any operating system and any hardware platform. The system may be distributed through any medium, such as a disc, non-volatile memory, or being available for downloading on a network. In other embodiments the system may be implemented in any firmware or any hardware.

Figure 47:
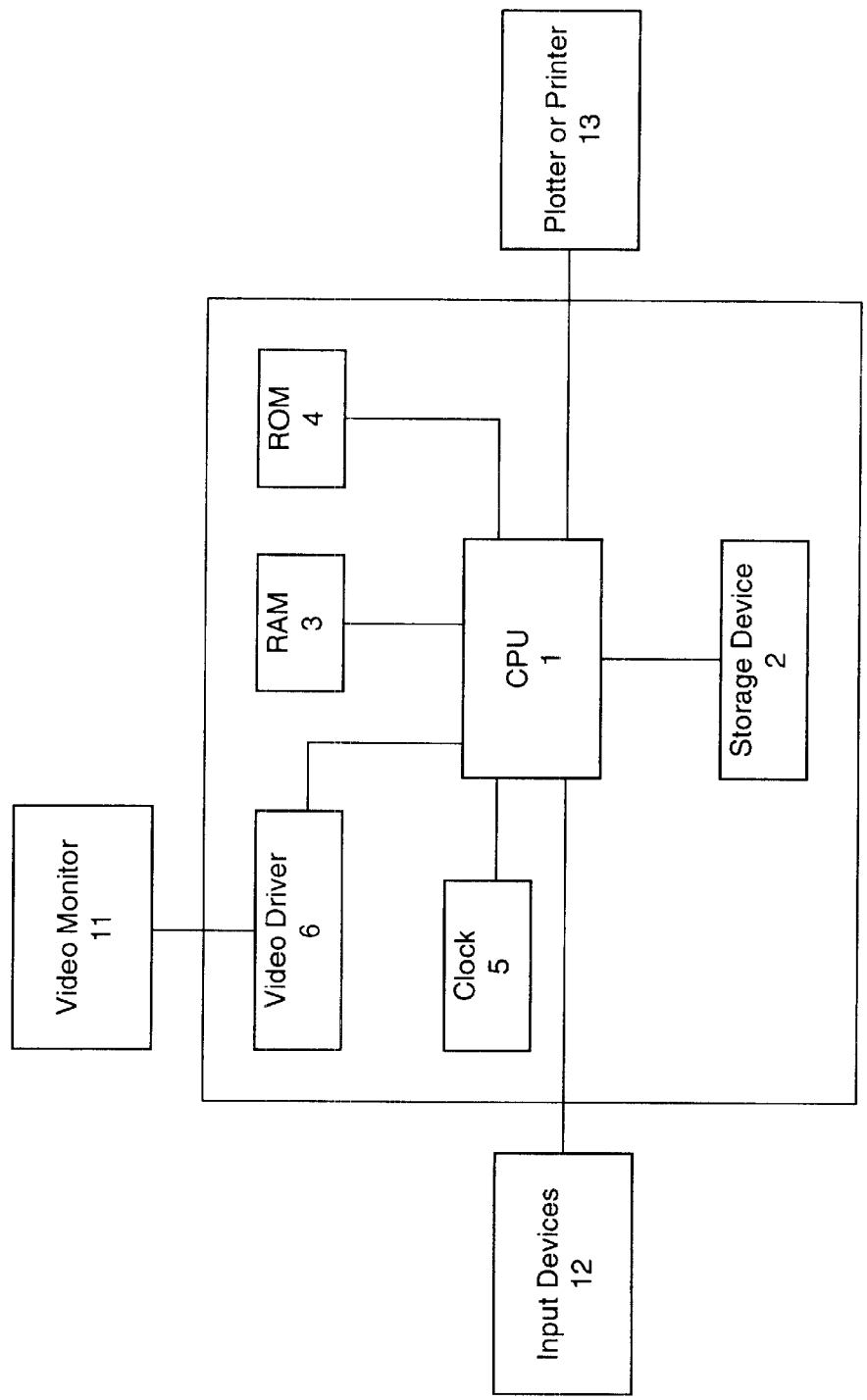
FIG. 47 is a view of one embodiment of the system for practicing the invention.

FIG. 47 shows a computer system on which the computer construction system can be implemented. The computer typically includes a CPU 1, a storage device 2 such as a hard disk drive, RAM 3, ROM 4, a clock 5, a video driver 6, and some peripherals such as a video monitor 11, input devices 12, and a plotter or printer 13. In one embodiment, the storage device stores a computer program, which is operative, with the processor, to perform the steps and methods discussed herein.

In FIGS. 1–41, all points are represented by small circles, and all tangent directions are represented by dashed arrows. A tangent direction only indicates the direction of a tangent vector; it does not indicate the length of the tangent vector. A point may be set by moving a cursor to a position and pressing a button on an input device (such as a mouse). A point and its corresponding tangent direction may be set in any one of a variety of ways well known in the art, for example, the point may be set by moving a cursor to a first position and pressing a button on an input device (such as a mouse), and the tangent direction may be set by dragging the cursor to a second position and releasing the button. The direction from the first position to the second position is the tangent direction. Only the radial direction from the first position to the second position is important; the distance between them is irrelevant. As discussed herein the curve components can be constructed as Bezier curves or circular arcs. It should be noted, however, that a wide range of curve types and formulas could be used to construct the curve components.

A curve component is connected with $G^0$ continuity to the previous curve component if its start point equals the end point of the previous curve component, it is connected with $G^1$ continuity to the previous curve component if its start point and start tangent direction equal the end point and end tangent direction of the previous curve component, and it is connected with $G^2$ continuity to the previous curve component if its start point, start direction, and start curvature equal the end point, end tangent direction, and end curvature of the previous curve component. The previous curve component is said to be connected to the curve component with the same continuity as the curve component is connected to the previous curve component. Since two neighbor curve components are at least connected by $G^0$ continuity, they always connect at a point. These connecting points are called anchor points, and the curve components are said to be connected with different types of continuity at the anchor points.

FIGS. 7–11—Peak-Point Curves

A first embodiment of the computer curve construction system is for constructing peak-point curves. In a first step shown in FIG. 7, a start point $a_0$ is set, and a start tangent direction $e_0$ is set. In a second step shown in FIG. 8, an end point $a_1$ is set, and an end tangent direction $e_1$ is set. In a third step shown in FIG. 9, a peak point $p_1$ is set between start point $a_0$ and end point $a_1$. A cubic Bezier curve $c_1$ is automatically drawn through points $a_0$, $p_1$, and $a_1$, with start and end tangent directions $e_0$ and $e_1$ and with peak point $p_1$, according to any suitable set of mathematical formulas.

The peak point $p_1$ is the point at the greatest distance $d_1$ between the curve $c_1$ and an imaginary line segment connecting the start point $a_0$ and the end point $a_1$. This imaginary line segment is often referred to as the chord. Since the peak point is the point at the greatest distance from the chord, the tangent vector at the peak point is parallel to the chord. The tangent direction at the peak point equals the chord vector, i.e. the vector from the start point to the end point. If the chord is horizontal, the peak point is the point at the peak.

This cubic Bezier curve $c_1$ is already drawn when the mouse button is pressed for the peak point $p_1$, and when the mouse is dragged, the peak point $p_1$ is dragged to a new position, and the cubic Bezier curve $c_1$ is changed, the final shape of which is drawn when the mouse is released.

Additional curve components of any type may be constructed to connect with $G^2$, $G^1$, or $G^0$ continuity. In optional additional steps shown in FIGS. 10 and 11, a second peak-point curve $C_2$ connected to curve component $c_1$ with $G^1$ continuity is constructed by setting an end point $a_2$, an end tangent direction $e_2$, and a peak point $p_2$. A cubic Bezier curve $c_2$ is automatically drawn through points $a_1$, $p_2$, and $a_2$, with start and end tangent directions $e_1$ and $e_2$ and peak point $p_2$. A composite curve is thus created with two curve components. If the second peak-point curve is connected with $G^0$ continuity, a new start tangent direction $e_1'$ has to be set first before setting an end point $a_2$, an end tangent direction $e_2$, and a peak point $p_2$. A cubic Bezier curve $c_2$ is automatically drawn through points $a_1$, $p_2$, and $a_2$, with start and end tangent directions $e_1'$ and $e_2$ and peak point $p_2$.

The peak-point curves are more intuitive, predictable, and accurate to construct than curve components with typical computer drawing programs, because the peak point directly determines its path.

An exemplar set of formulas for determining the cubic Bezier curve of a peak-point curve is as follows:

The equation for the cubic Bezier curve is $$x(t)=(1-t)^3 b_0 + 3t(1-t)^2 b_1 + 3t^2(1-t)b_2 + t^3 b_3,$$

where $b_0, b_1, b_2, b_3$ are the control points. The first derivative of the cubic Bezier curve is $$x'(t)=3((1-t)^2(b_1-b_0)+2t(1-t)(b_2-b_1)+t^2(b_3-b_2)).$$

The start and end points are $a_0$ and $a_1$. The start and end tangent vectors are $x'(0)=\lambda e_0$ and $x'(1)=\mu e_1$, where $\lambda$ and $\mu$ are positive real numbers and $e_0$ and $e_1$ are vectors of length 1. Again, the peak point $p_1$ is the point on the curve at the greatest distance from the chord. Let $\tau$ be the parameter for $p_1$.

Then $$b_0 = a_0$$

$$b_1 = \frac{\lambda}{3}e_0 + a_0$$

$$b_2 = a_1 - \frac{\mu}{3}e_1$$

$$b_3 = a_1.$$

There are 2 cases with the following assumptions, where "sign" means signature and "×" denotes the vector product between two 2-dimensional vectors, which equals the determinant of the matrix formed by the two vectors:

1) If $e_0 \times e_1 \neq 0$, assume that $\text{sign}(e_0 \times (a_1-a_0))=\text{sign}(e_1 \times (a_0-a_1)) \neq 0$ and that the peak point $p_1$ lies inside the area of the ray corresponding to the start tangent direction, the ray opposite to the end tangent direction, and the chord.

2) If $e_0 \times e_1 = 0$, also assume that $\text{sign}(e_0 \times (a_1-a_0))=\text{sign}(e_1 \times (a_0-a_1)) \neq 0$ and that the peak point $p_1$ lies inside the area of the ray corresponding to the start tangent direction, the ray opposite to the end tangent direction, and the chord.

Let it be mentioned that for peak-point curves, and also for point-point, point-tangent, point, and curvature curves, the assumption that $\text{sign}(e_0 \times (a_1-a_0))=\text{sign}(e_1 \times (a_0-a_1))$ is only for a particular embodiment for the purpose of avoiding that the Bezier curve has an inflection point, and the assumption is only a sufficient assumption not a necessary assumption. Also, the additional assumption that $\text{sign}(e_0 \times (a_1-a_0)) \neq 0$ is only for a particular embodiment for the purpose of avoiding that the cubic Bezier curve is a straight line segment so that the straight line segment can be constructed explicitly.

The following formulas are provided for these two cases above:

1) For $\tau$ there is the following algebraic equation of order 5:

$$f(\tau)=(e_1 \times (a_0-s_1)) \, (e_0 \times (a_1-a_0)) \, (\tau-4\tau^2+3\tau^3)$$
$$+(e_0 \times (a_0-s_1)) \, (e_1 \times (a_0-a_1)) \, (2\tau-5\tau^2+3\tau^3)$$
$$+(e_0 \times (a_1-a_0)) \, (e_1 \times (a_0-a_1)) \, (3\tau^3-5\tau^4+2\tau^5)=0,$$

and for $\lambda$ and $\mu$ $$= \frac{1}{(e_0 \times e_1)\tau(1-\tau)^2}(e_1 \times (a_0 - s_1) + (e_1 \times (a_0 - a_1))(-3\tau^2 + \tau^3))$$

$$= \frac{1}{(e_0 \times e_1)\tau^2(1-\tau)}(e_0 \times (a_0 - s_1) + (e_0 \times (a_1 - a_0))(3\tau^2 - 2\tau^3))$$

2) For $\tau$ there is the following algebraic equation of order 3:

$$f(\tau)=e_1 \times (a_0-s_1)+(e_1 \times (a_0-a_1))(-3\tau^2+2\tau^3)=0,$$

and for $\lambda$ and $\mu$ the following system of linear equations if $a_0 \neq 0$ $$(e_0 \times a_0)(\tau(1-\tau^2))\lambda-(e_1 \times a_0)(\tau^2(1-\tau))\mu-s_1 \times a_0+(a_1 \times a_0)(3\tau^2-2\tau^3)=0$$

or if $a_0=0$ $$(e_0 \times a_1)(\tau(1-\tau^2))\lambda - (e_1 \times a_1)(\tau^2(1-\tau))\mu - s_1 \times a_1 + (a_0 \times a_1)(1-3\tau^2+2\tau^3) = 0$$

and $$(e_0 \times (a_1-a_0))(1-4\tau+3\tau^2)\lambda + (e_1 \times (a_0-a_1))(2\tau-3\tau^2)\mu = 0.$$

For the two algebraic equations there are the following solutions: The two algebraic equations are solved the same way. Let the derivative $f'(\tau)$ be unequal to 0 at the iterated solutions below.

As an initial solution $$\tau_0 = 0.5$$

is taken, and the algebraic equations are solved through Newton's iteration method $$\tau_{i+1} = \tau_i - \frac{f(\tau_i)}{f'(\tau_i)},$$

where for case 1) above $$f'(\tau_i) = (e_1 \times (a_0 - s_1))(e_0 \times (a_1 - a_0))(1 - 8\tau_i + 9\tau_i^2)$$

$$+ (e_0 \times (a_0 - s_1))(e_1 \times (a_0 - a_1))(2 - 10\tau_i + 9\tau_i^2)$$

$$(e_0 \times (a_1 - a_0))(e_1 \times (a_0 - a_1))(9\tau_i^2 - 20\tau_i^3 + 10\tau_i^4)$$

and for case 2) above $$f'(\tau_i) = e_1 \times (a_0 - a_1)(-6\tau_i + 6\tau_i^2).$$

If the peak point lies close to any of the rays corresponding to the start tangent direction or opposite of the end tangent direction, the algebraic equations have no solution, and the formulas for the following two point-tangent curves (which are connected with $G^1$ continuity), as described later, are used: For the first point-tangent curve the start point and start tangent direction are the start point and start tangent direction of the peak-point curve, and the end point and end tangent direction are the peak point of the peak-point curve and the tangent direction at the peak point. For the second point-tangent curve the start point and start tangent direction are the peak point of the peak point curve and the tangent direction at the peak point, and the end point and end tangent direction are the end point and end tangent direction of the peak-point curve.

FIGS. 12–18—Point-Point Curves

Figure 1:
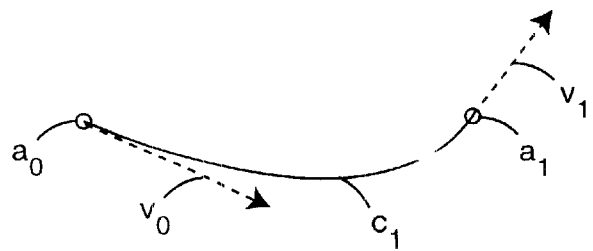
FIG. 1 illustrates a prior art curve.
Figure 2:
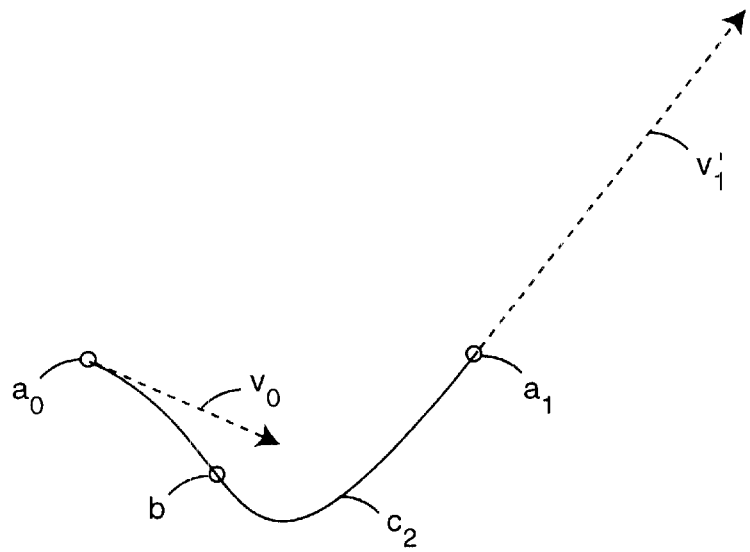
FIG. 2 illustrates another prior art curve.
Figure 3:
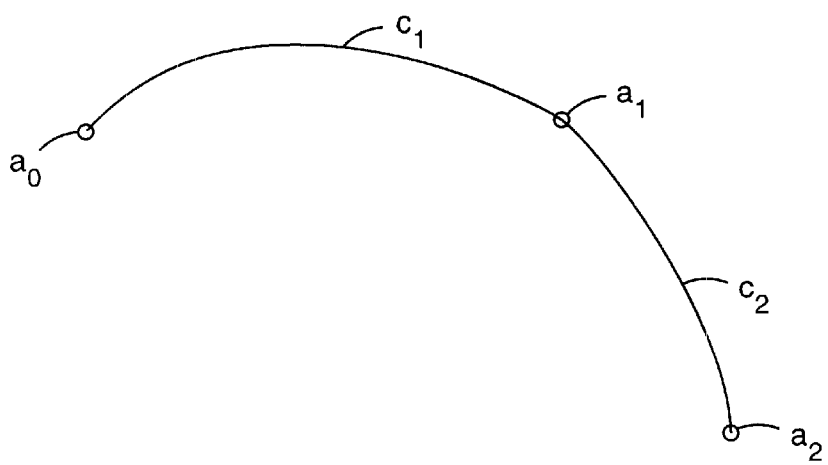
FIG. 3 illustrates another prior art curve.
Figure 4:
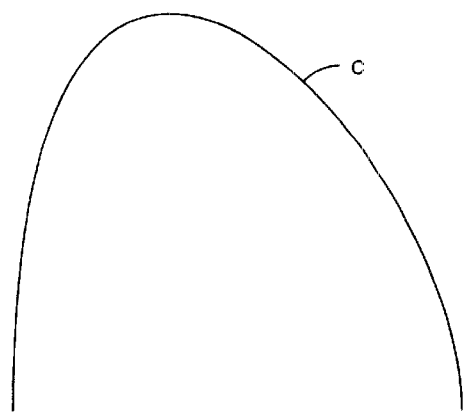
FIG. 4 illustrates a curve to be traced.
Figure 5:
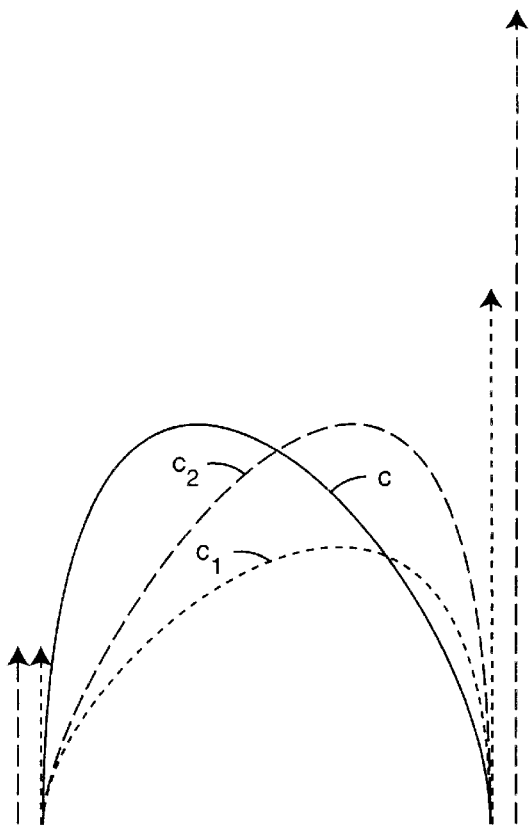
FIG. 5 illustrates the first and second attempt of prior art curves to trace the curve.
Figure 6:
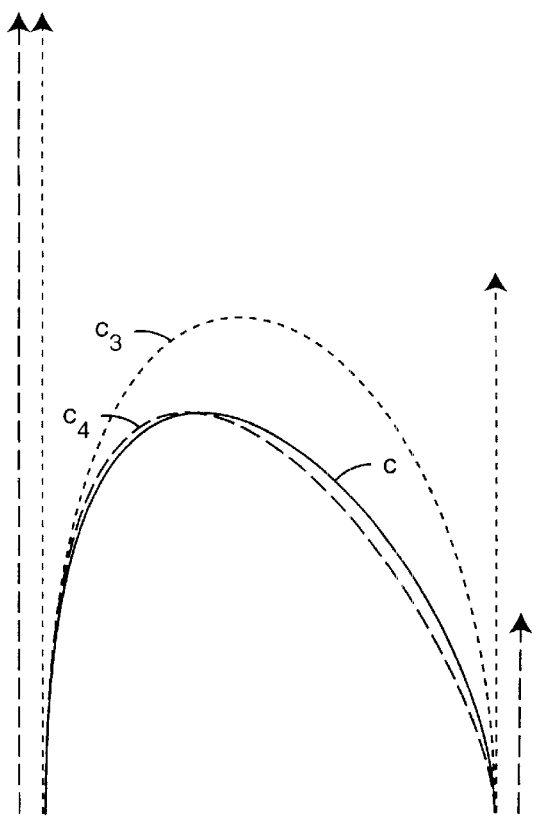
FIG. 6 illustrates the third and fourth attempts of prior art curves to trace the curve.
Figure 7:
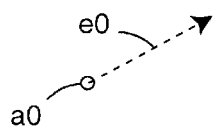
FIG. 7 is a first step in constructing a peak-point curve.
Figure 8:
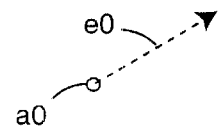
FIG. 8 is a second step in constructing a peak-point curve.
Figure 8:
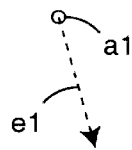
Figure 9:
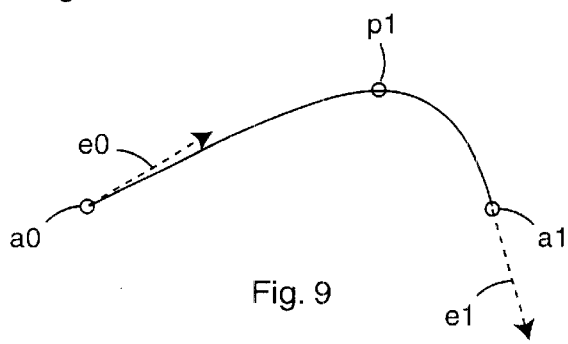
FIG. 9 is a third step in constructing a peak-point curve.
Figure 10:
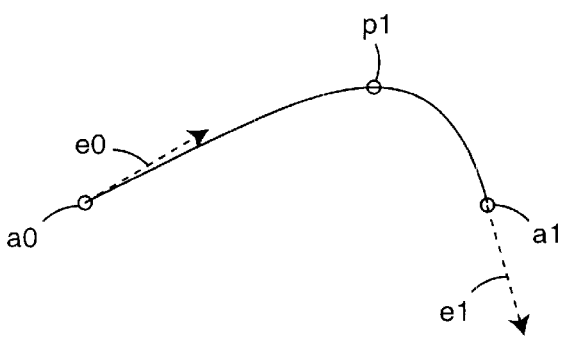
FIG. 10 is a fourth step in constructing a peak-point curve.
Figure 10:
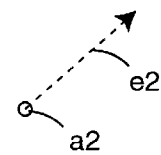
Figure 11:
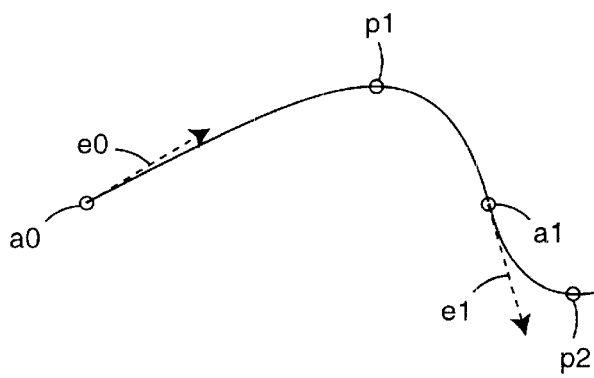
FIG. 11 is a fifth step in constructing a peak-point curve.
Figure 11:
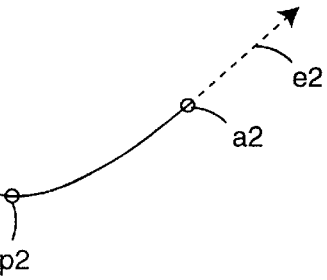
Figure 12:
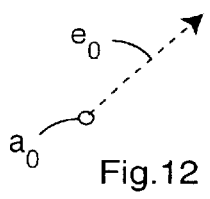
FIG. 12 is a first step in constructing a point-point curve.
Figure 13:
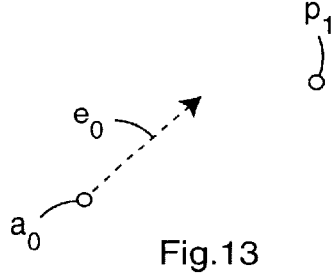
FIG. 13 is a second step in constructing a point-point curve.
Figure 14:
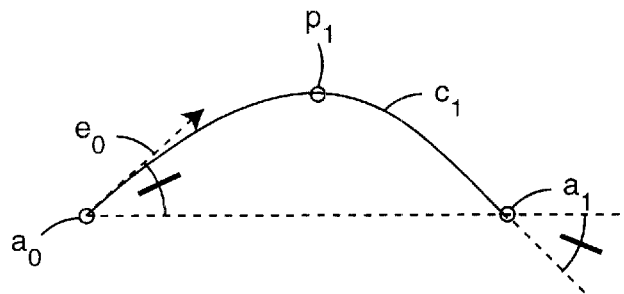
FIG. 14 is a third step in constructing a point-point curve.
Figure 15:
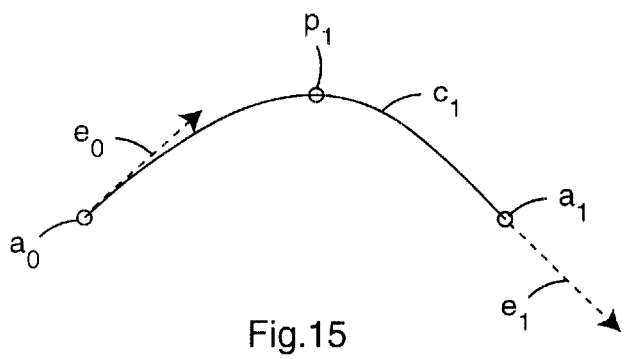
FIG. 15 is a fourth step in constructing a point-point curve.
Figure 16:
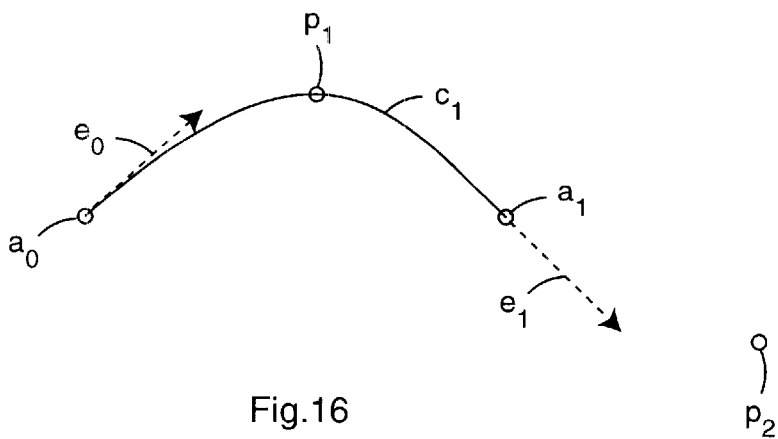
FIG. 16 is a fifth step in constructing a point-point curve.
Figure 17:
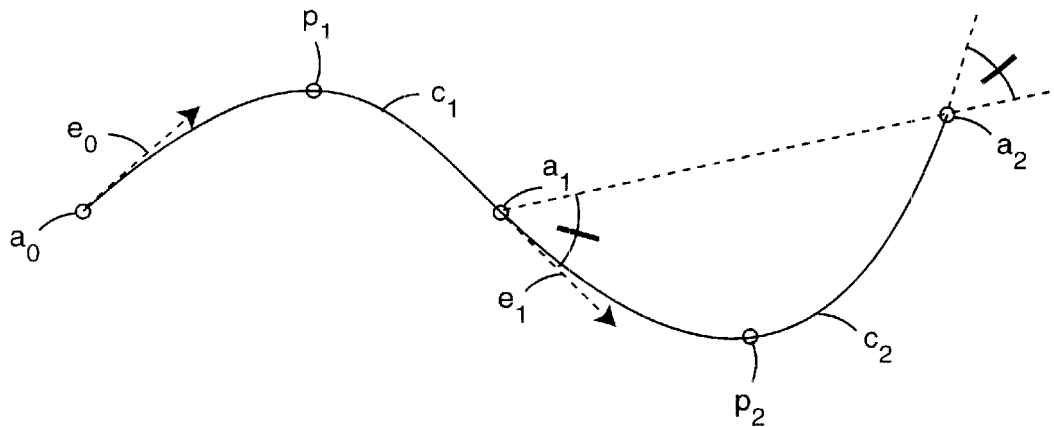
FIG. 17 is a sixth step in constructing a point-point curve.

A second embodiment of the computer curve construction system is for constructing point-point curves. In a first step shown in FIG. 12, a start point $a_0$ is set, and a start tangent direction $e_0$ is set. In a second step shown in FIG. 13, a peak point $p_1$ is set. In a third step shown in FIG. 14, an end point $a_1$ is set. A cubic Bezier curve $c_1$ is automatically drawn through points $a_0$, $p_1$, and $a_1$, with start tangent direction $e_0$ and peak point $p_1$, according to any suitable set of mathematical formulas. As shown in FIG. 15, an end tangent direction $e_1$ is automatically set in a symmetric way such that the angle between the chord vector and the end tangent direction equals the angle between the start tangent direction and the chord vector. (However it could be set in any other way as well.)

This cubic Bezier curve $c_1$ is already drawn when the mouse button is pressed for the end point $a_1$, and when the mouse is dragged, the end point $a_1$ is dragged to a new position, and the cubic Bezier curve $c_1$ is changed, the final shape of which is drawn when the mouse is released.

Figure 18:
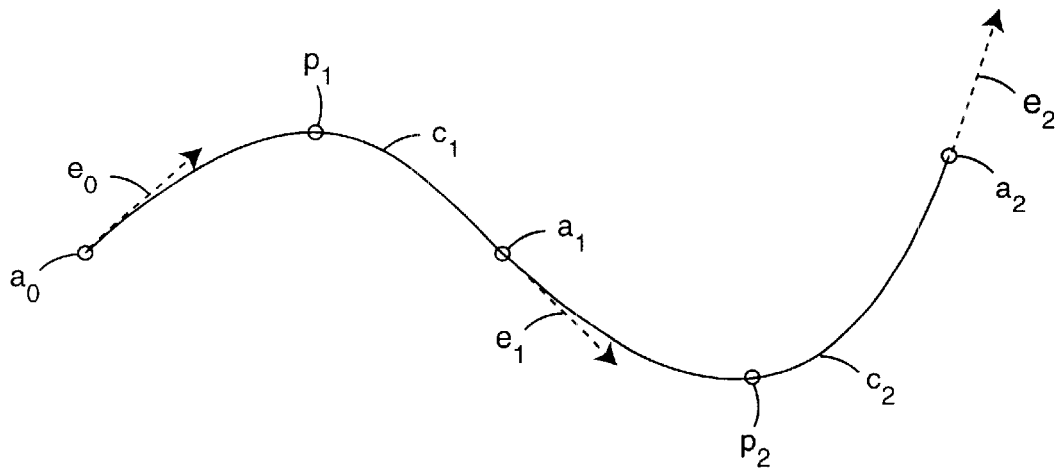
FIG. 18 is a seventh step in constructing a point-point curve.
Figure 19:
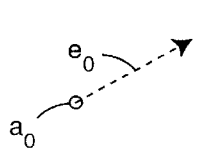
FIG. 19 is a first step in constructing a point-tangent curve.
Figure 20:
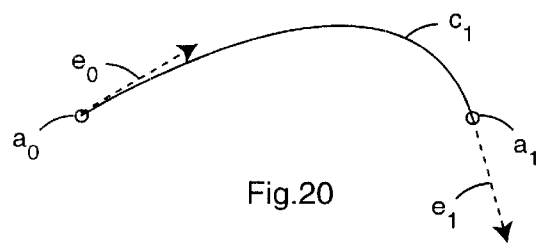
FIG. 20 is a second step in constructing a point-tangent curve.

Additional curve components of any type may be constructed to connect with $G^2$, $G^1$, or $G^0$ continuity. In optional additional steps shown in FIGS. 16 and 17, a second point-point curve $c_2$ connected to curve component $c_1$ with $G^1$ continuity is constructed by setting a peak point $p_2$ and an end point $a_2$. A cubic Bezier curve $c_2$ is automatically drawn through points $a_1$, $p_2$ and $a_2$, with start tangent direction $e_1$ and peak point $p_2$. As shown in FIG. 18, an end tangent direction $e_2$ is automatically set in the same way as for the first curve component $c_1$. A composite curve is thus created with two curve components. If the second point-point curve is connected with $G^0$ continuity, a new start tangent direction $e_1'$ has to be set first before setting a peak point $p_2$ and an end point $a_2$. A cubic Bezier curve $c_2$ is automatically drawn through points $a_1$, $p_2$ and $a_2$, with start tangent direction $e_1'$ and peak point $p_2$. Again an end tangent direction $e_2$ is automatically set in the same way as for the first curve component curve $c_1$.

The point-point curves are easy to construct, because the end tangent direction of each curve component is automatically determined.

An exemplar set of formulas for determining the cubic Bezier curve of a point-point curve is as follows:

The following assumption is made:

Assume that $\text{sign}(e_0 \times (a_1 - a_0)) \neq 0$, and assume that the peak point $p_1$ lies inside the area of the ray corresponding to the start tangent direction, the ray opposite to the end tangent direction, and the chord.

After determining the end tangent direction $e_1$ as described above, the formulas for a point-point curve are the same as the formulas for a peak-point curve.

FIGS. 19–23—Point-Tangent Curves

Figure 21:
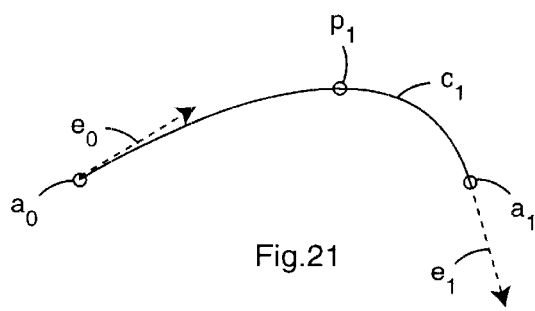
FIG. 21 is a third step in constructing a point-tangent curve.
Figure 22:
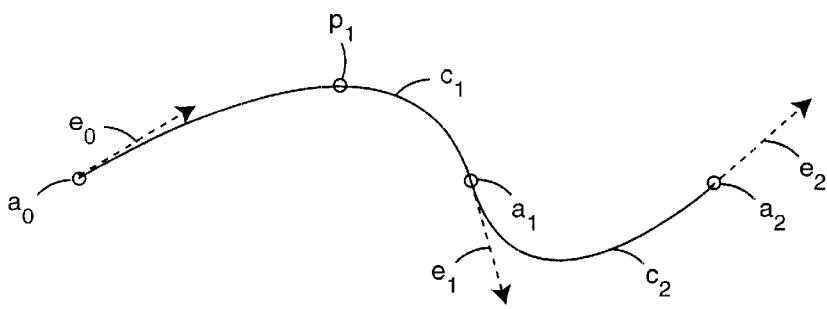
FIG. 22 is a fourth step in constructing a point-tangent curve.

A third embodiment of the computer curve construction system is for constructing point-tangent curves. In a first step shown in FIG. 19, a start point $a_0$ and a start tangent direction $e_0$ are set. In a second step shown in FIG. 20, an end point $a_1$ and an end tangent direction $e_1$ are set. A quadratic Bezier curve $c_1$ is automatically drawn through start and end points $a_0$ and $a_1$, with start and end tangent directions $e_0$ and $e_1$, according to any suitable set of mathematical formulas. As shown in FIG. 21, a peak point $p_1$ is automatically set by computing the peak point of the quadratic Bezier curve $c_1$. (However it could be set in any other way as well and a cubic Bezier curve could be drawn with the set peak point).

This quadratic Bezier curve $c_1$ is already drawn when the mouse is dragged to the position of the end tangent direction $e_1$, and when the mouse is dragged further, the end tangent direction $e_1$ is dragged to a new position, and the quadratic Bezier curve $c_1$ is changed, the final shape of which is drawn when the mouse is released.

Figure 23:
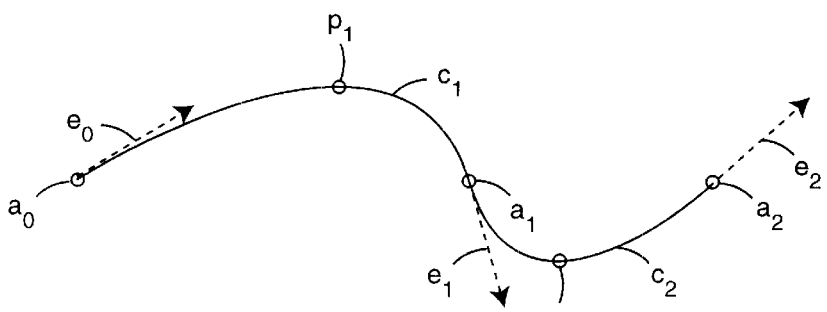
FIG. 23 is a fifth step in constructing a point-tangent curve.
Figure 24:
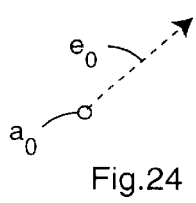
FIG. 24 is a first step in constructing a point curve.
Figure 25:
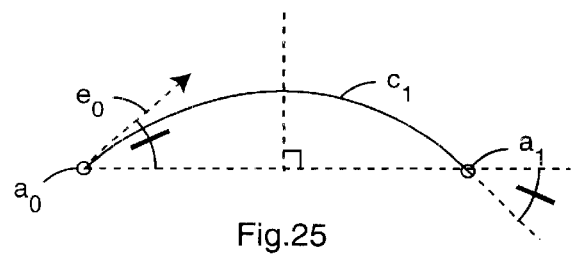
FIG. 25 is a second step in constructing a point curve.

Additional curve components of any type may be constructed to connect with $G^2$, $G^1$, or $G^0$ continuity. In an optional additional step shown in FIG. 22, a second point-tangent curve $c_2$ connected to curve component $c_1$ with $G^1$ continuity is constructed by setting an end point $a_2$ and an end tangent direction $e_2$. A second quadratic Bezier curve $c_2$ is automatically drawn through start and end points $a_1$ and $a_2$, with start and end tangent directions $e_1$ and $e_2$. As shown in FIG. 23, a peak point $p_2$ is automatically set by computing the peak point of the quadratic Bezier curve $c_2$. A composite curve is thus created with two curve components. If the point-tangent curve is connected with $G^0$ continuity, a new start tangent direction $e_1'$ has to be set first before setting end point $a_2$ and an end tangent direction $e_2$. A quadratic Bezier curve $c_2$ is automatically drawn through points $a_1$ and $a_2$, with start and end tangent directions $e_1'$ and $e_2$. Again a peak point $p_2$ is automatically set by computing the peak point of the quadratic Bezier curve $c_2$.

The point-tangent curves are easy to construct, because the peak point of each curve component is automatically determined.

An exemplar set of formulas for determining the quadratic Bezier curve of a point-tangent curve is as follows:

The equation for the quadratic Bezier curve is $$x(t)=(1-t)^2 b_0 + 2t(1-t)b_1 + t^2 b_2,$$

where $b_0$, $b_1$, $b_2$ are the control points. The first derivative of the quadratic Bezier curve is $$x'(t)=2((1-t)(b_1-b_0)+t(b_2-b_1)).$$

The start and end points are $a_0$ and $a_1$. The start and end tangent vectors are $x'(0)=\lambda e_0$ and $x'(1)=\mu e_1$, where $\lambda$ and $\mu$ are positive real numbers and $e_0$ and $e_1$ are vectors of length 1.

Then $$b_0 = a_0$$
$$b_1 = \frac{\lambda}{2} e_0 + a_0 = a_1 - \frac{\mu}{2} e_1$$
$$b_2 = a_1.$$

The following assumptions are made:
Assume that $\text{sign}(e_0 \times (a_1-a_0))=\text{sign}(e_1 \times (a_0-a_1))=\text{sign}(e_0 \times e_1) \neq 0$.

The following formulas are provided:
For $\lambda$ and $\mu$ $$\lambda = \frac{2e_1 \times (a_0 - a_1)}{(e_0 \times e_1)}$$
$$\mu = \frac{2e_0 \times (a_1 - a_0)}{(e_0 \times e_1)}$$

and for the parameter $\tau$ of the peak point which has the greatest distance from the chord $$\tau=0.5$$

(The parameter for the peak point of a quadratic Bezier curve is always 0.5. However this is not true for cubic Bezier curves.)

FIGS. 24–28—Point Curves

Figure 26:
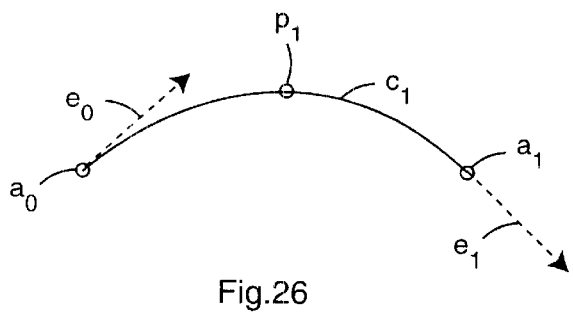
FIG. 26 is a third step in constructing a point curve.
Figure 27:
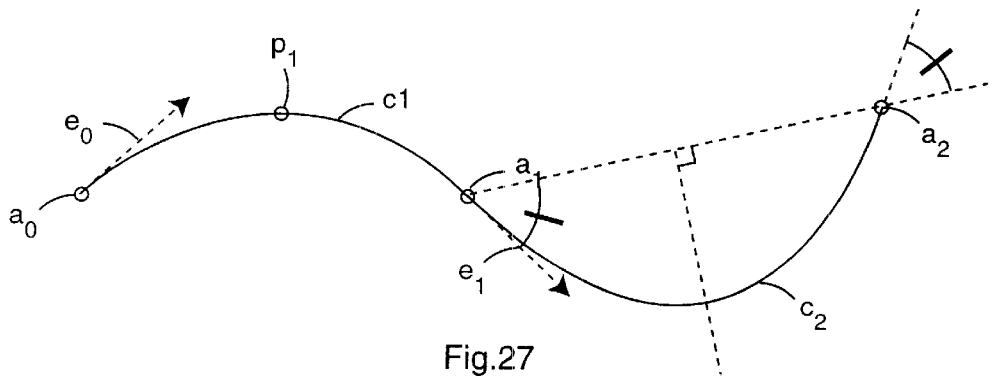
FIG. 27 is a fourth step in constructing a point curve.

A fourth embodiment of the computer curve construction system is for constructing point curves. In a first step shown in FIG. 24, a start point $a_0$ and a start tangent direction $e_0$ are set. In a second step shown in FIG. 25, an end point $a_1$ is set. A quadratic Bezier curve $c_1$ is automatically drawn through start and end points $a_0$ and $a_1$ with start tangent direction $e_0$, to any suitable set of mathematical formulas. As shown in FIG. 26, an end tangent direction $e_1$ for end point $a_1$ is automatically set in a symmetric way such that equals the angle between the chord vector and the end tangent direction equals the angle between the start tangent direction and the chord, and a peak point $p_1$ is also automatically set by computing the peak point of the quadratic Bezier curve $c_1$. In this embodiment the whole curve component $c_1$ is symmetric with respect to the axis that is perpendicular to the chord and goes through the center of the chord. (However both the end tangent direction and the peak point could be set in any other way as well and a cubic Bezier curve could be drawn with the set end tangent direction and set peak point).

This quadratic Bezier curve $c_1$ is already drawn when the mouse button is pressed for the end point $a_1$, and when the mouse is dragged, the end point $a_1$ is dragged to a new position, and the quadratic Bezier curve $c_1$ is changed, the final shape of which is drawn when the mouse is released.

Figure 28:
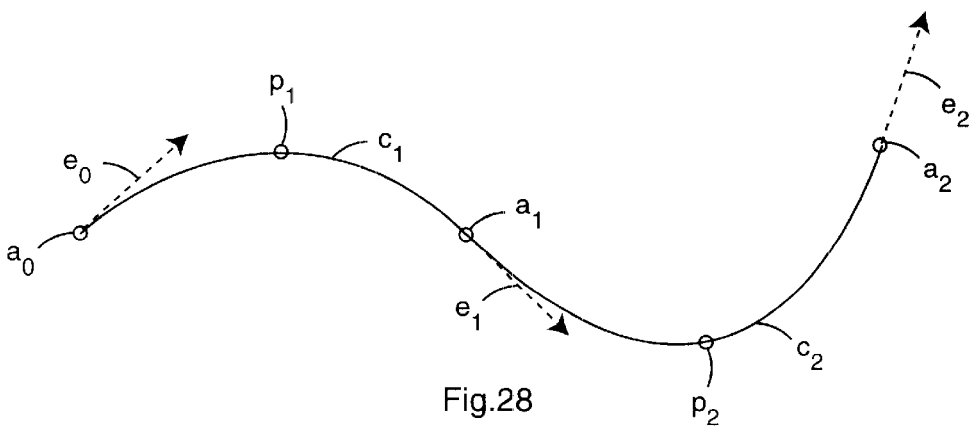
FIG. 28 is a fifth step in constructing a point curve.
Figure 32:
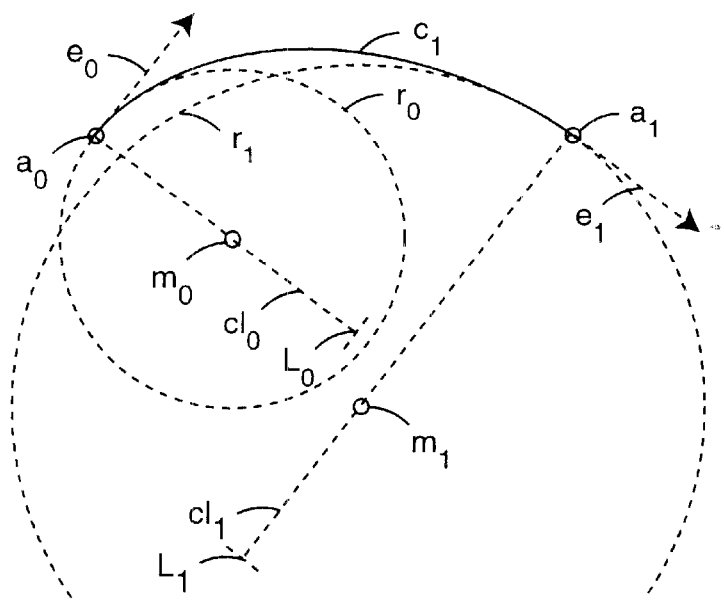
FIG. 32 is a fourth step in constructing a curvature curve.

Additional curve components of any type may be constructed to connect with $G^2$, $G^1$, or $G^0$ continuity. In an optional additional step shown in FIG. 27, a second point curve $c_2$ connected to curve component $c_1$ with $G^1$ continuity is constructed by simply setting an end point $a_2$. A second quadratic Bezier curve $c_2$ is automatically drawn through start and end points $a_1$ and $a_2$, with start tangent direction $e_1$. As shown in FIG. 28, an end tangent direction $e_2$ is automatically set in the same way as for the first curve component $c_1$, and a peak point $p_2$ is also automatically set by computing the peak point of the quadratic Bezier curve. A composite curve is thus created with two curve components. If the second point curve is connected with $G^0$ continuity, a new start tangent direction $e_1'$ has to be set first before setting the end point $a_2$. A second quadratic Bezier curve $c_2$ is automatically drawn through points $a_1$ and $a_2$, with start and end tangent directions $e_1'$ and $e_2$. Again an end tangent direction $e_2$ is automatically set in a symmetric way such that the angle between the chord vector and the end tangent direction equals the angle between the start tangent direction and the chord vector, and a peak point $p_2$ is also automatically set by computing the peak point of the quadratic Bezier curve.

The point curves are easy to construct, because the end tangent direction and the peak point of each curve component are automatically determined.

An exemplar set of formulas for determining the quadratic Bezier curve of a point curve is as follows:

The following assumption is made:
Assume that the angle between $e_0$ and $a_1-a_0$ is smaller than 90° and larger than 0°.

After determining the end tangent direction $e_1$ as described above, the formulas for a point curve are the same as the formulas for a point-tangent curve.

If the point curve is the first curve component or the nth curve component that is connected with $G^0$ continuity to the (n-1)th curve component, it can also be constructed in a differenent way. It can be constructed by setting (a start point $a_0$ if it is the first curve component and) a peak point $p_n$ and an end point $a_n$. The formula for this construction is $$b_1 = 2(p_n - 0.25 a_{n-1} - 0.25 a_n),$$

Where $b_1$ is the control point and $a_{n-1}$ is the end point of the (n-1)th component.

FIGS. 29–35—Curvature Curves

The embodiment of the curvature curve construction system allows for constructing curvature curves. In a first step shown in FIG. 29, a start point $a_0$ and a start tangent direction $e_0$ are set. In a second step shown in FIG. 30, and end point $a_1$ and an end tangent $e_1$ are set. If the angle between the start tangent direction and the end tangent direction is smaller than 180°, the start and end curvatures have to either both be small or both be large depending on the position to the start and end points and the start and end tangent directions. Once these features are drawn, the rays $I_0$ and $I_1$ perpendicular to the tangent directions on the same side of the tangent directions as the chord are drawn together with limit points $L_0$ and $L_1$ on the rays, which show that the centers of the curvature circles have to either both be before these limit points or after these limit points. In a third step shown in FIG. 31, a center $m_0$ of a curvature circle (osculating circle) $r_0$ for the start curvature is set on the ray $I_0$. Since placing a cursor (not shown) exactly on $I_0$ is difficult, center $m_0$ is projected onto $I_0$ automatically from the cursor. Once the start curvature is drawn, the line segment or ray of $I_0$ on the same side of the start limit point $L_0$ as $m_0$, which is called start curvature line $cI_0$, is drawn, and the line segment or ray of $I_1$ on the same side of the end limit point $L_1$, which is called end curvature line $cI_1$, is drawn. (In the case that the angle between the start tangent direction and the end tangent direction is 180° or larger, there are no limit points, and $cI_0=I_0$ and $cI_1=I_1$.) In a fourth step shown in FIG. 32, a center $m_1$ of a curvature circle for the end curvature is set on $cI_1$. Since placing a cursor (not shown) exactly on $cI_1$ is difficult, center $m_1$ is projected onto $cI_1$ automatically from the cursor. If, as an example, a curvature of zero is desired for the start or end curvature, the center of the curvature circle would be at infinity, but the center is shown at the point and the cursor is placed anywhere on the line of the tangent direction at the point and gets projected onto the point. A cubic Bezier curve $c_1$ is automatically drawn through start and end points $a_0$ and $a_1$, with start and end tangent directions $e_0$ and $e_1$ and start and end curvature circle centers $m_0$ and $m_1$ according to any suitable set of mathematical formulas. The start curvature of the cubic Bezier curve $c_1$ is defined by the curvature of the start curvature circle $r_0$, and the end curvature of the cubic Bezier curve $c_1$ is defined by the curvature of the end curvature circle $r_1$.

Figure 33:
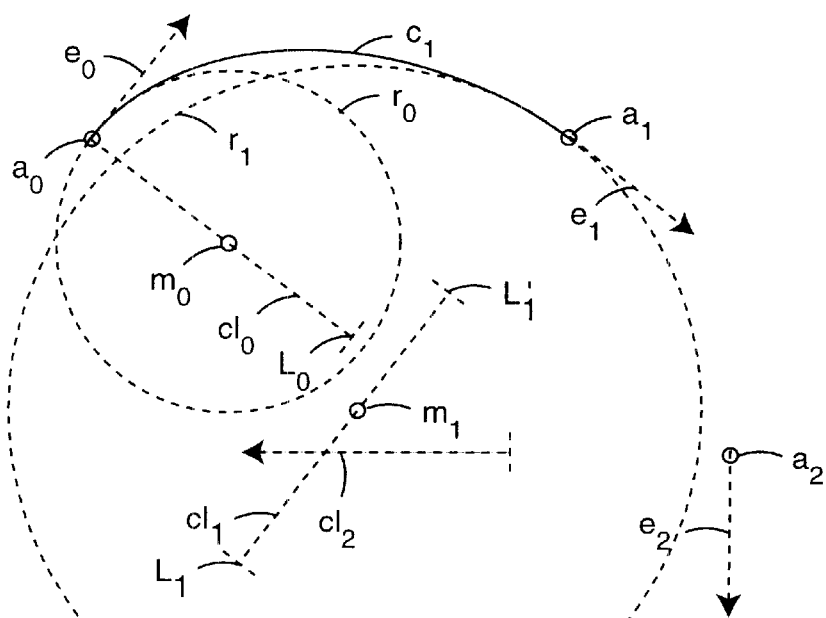
FIG. 33 is a fifth step in constructing a curvature curve.
Figure 34:
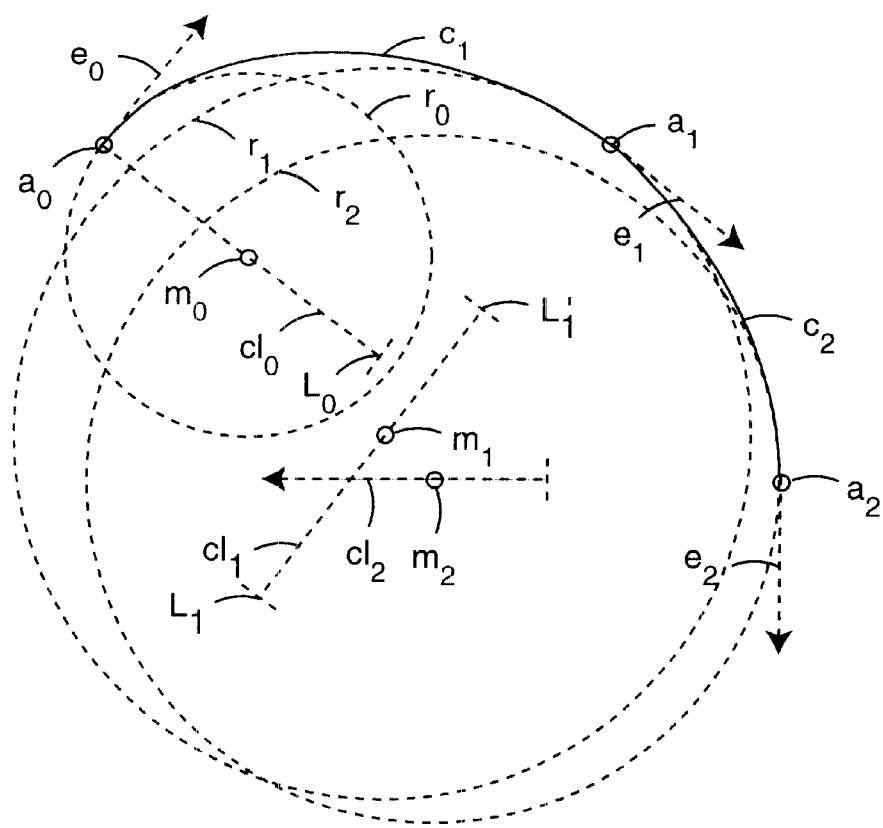
FIG. 34 is a sixth step in constructing a curvature curve.
Figure 35:
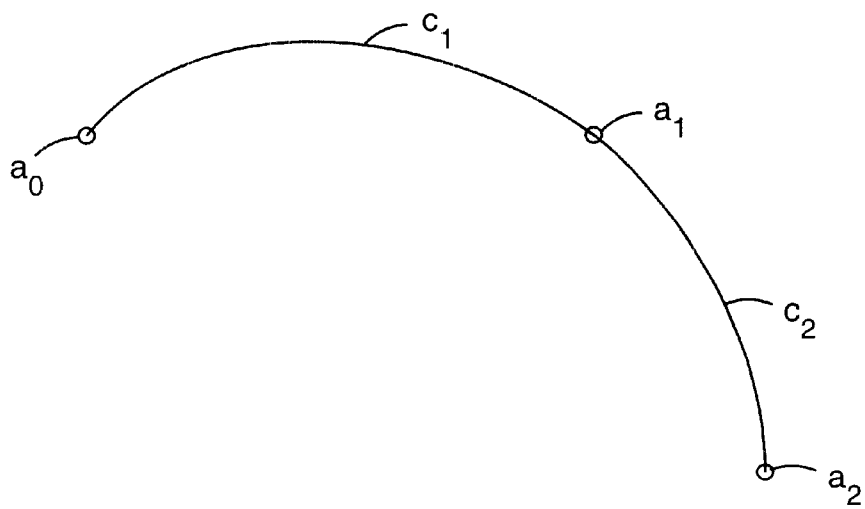
FIG. 35 is a final illustration of the constructed curvature curve.
Figure 42:
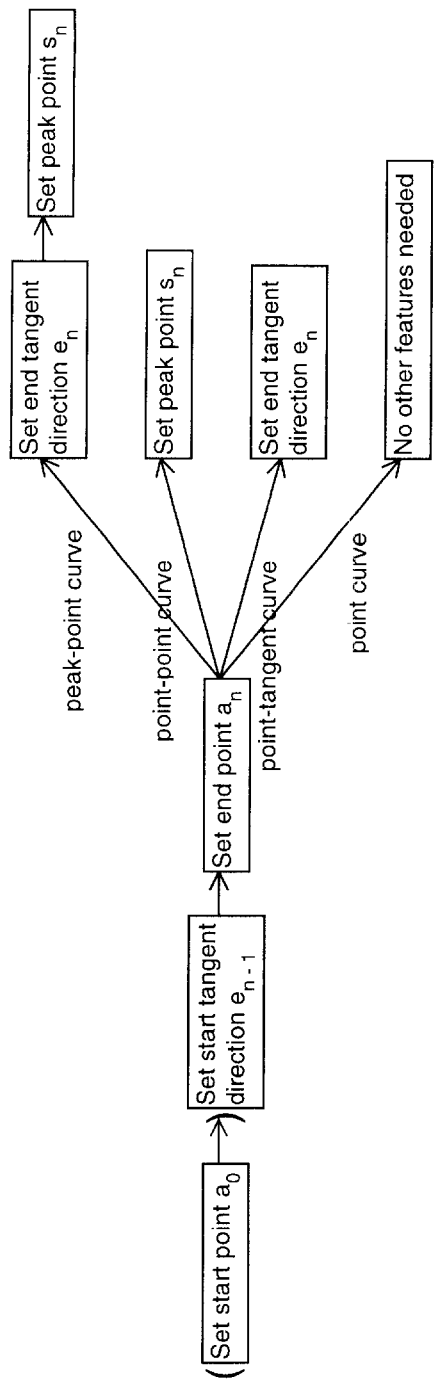
FIG. 42 is a flow chart showing a method for constructing a peak-point, point-point, point-tangent, or point curve as the first component or as the nth component connected with $G^0$ continuity to the (n−1)th component. (Setting the start point $a_0$ is only for the first component.)
Figure 43:
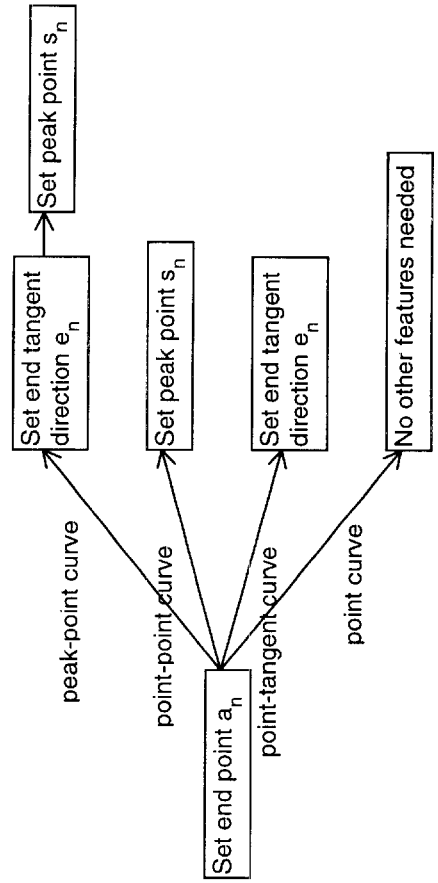
FIG. 43 is a flow chart showing a method for constructing a peak-point, point-point, point-tangent, or point curve as the nth component connected with $G^1$ continuity to the (n−1)th component.
Figure 44:
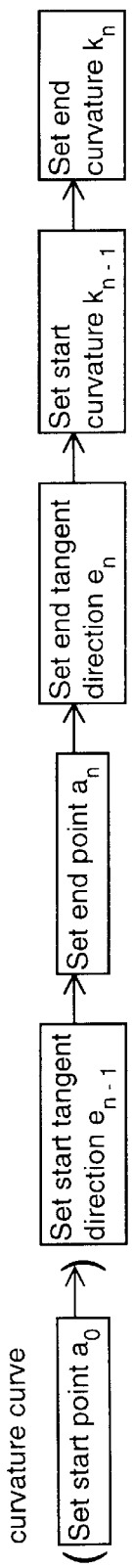
FIG. 44 is a flow chart showing a method for constructing a curvature curve as the first component or the n'th component connected with $G^0$ continuity to the (n−1)th component. (Setting the start point $a_0$ is only for the first component.)
Figure 45:
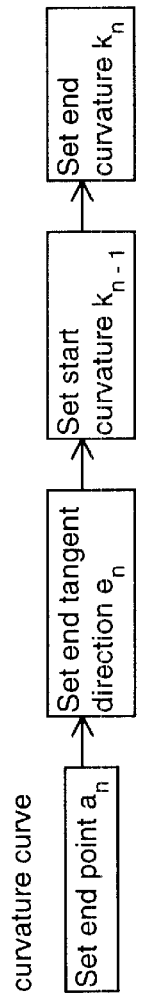
FIG. 45 is a flow chart showing a method for constructing a curvature curve as the n'th component connected with $G^1$ continuity to the (n−1)th component.
Figure 46:
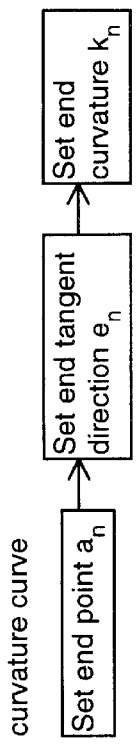
FIG. 46 is a flow chart showing a method for constructing a curvature curve as the n'th component connected with $G^2$ continuity to the (n−1)th component.

Additional curve components of any type may be constructed to connect with $G^2$, $G^1$, or $G^0$ continuity. In an optional fifth and sixth step as shown in FIGS. 33 and 34 an end point $a_2$, an end tangent direction $e_2$ and a center $m_2$ of an end curvature circle of a second curvature curve $c_2$ connected to curve $c_1$ with $G^2$ continuity is constructed. Once the end point and the end tangent direction are constructed, the end curvature line $cI_2$ is drawn, and the new start curvature line $cI_1$ is drawn, which is the intersection of the start curvature line of the second curve component with start limit point $L_1'$ and the end curvature line of the first curve component. A cubic Bezier curve $c_2$ is automatically drawn through start and end points $a_1$ and $a_2$, with start and end tangent directions $e_1$ and $e_2$, with the set start and end curvatures. The final curve consisting of curve component $c_1$ and curve component $c_2$ is shown in FIG. 35. If the second curvature curve is connected with $G^1$ continuity, a new center $m_1'$ of the start curvature circle has to be set after setting an end point $a_2$ and an end tangent direction $e_2$, and before setting a center $m_2$ of an end curvature circle. A cubic Bezier curve $c_2$ is automatically drawn through start and end points $a_1$ and $a_2$, with start and end tangent directions $e_1$ and $e_2$, with the set start and end curvatures. If the second curvature curve is connected with $G^0$ continuity, a new start tangent $e_1'$ has to be set first, and a new center $m_1'$ of the start curvature circle has to be set after setting an end point $a_2$ and an end tangent direction $e_2$, and before setting a center $m_2$ of an end curvature circle. A cubic Bezier curve $c_2$ is automatically drawn through points $a_1$ and $a_2$, with start and end tangent directions $e_1$ and $e_2$, with the set start and end curvatures. The curvature curve is very smooth if $G^2$ continuity is used, because adjacent curves are connected not only with the same tangent direction, but also with the same curvature.

An exemplar set of formulas for determining the curvature curve is as follows:

The equation for the cubic Bezier curve is $$x(t)=(1-t)^3 b_0 + 3t(1-t)^2 b_1 + 3t^2(1-t) b_2 + t^3 b_3,$$

where $b_0, b_1, b_2, b_3$ are the control points. The first derivative of the cubic Bezier curve is $$x'(t)=3((1-t)^2(b_1-b_0)+2t(1-t)(b_2-b_1)+t^2(b_3-b_2)).$$

The second derivative of the cubic Bezier curve is $$x''(t)=6((1-t)(b_2-2b_1+b_0)+t(b_3-2b_2+b_1)).$$

The curvature k(t) at the parameter t is $$k(t) = \frac{x'(t) \times x''(t)}{|x'(t)|^3},$$

where "×" denotes the vector product between two 2-dimensional vectors. The start and end points are $a_0$ and $a_1$. The start and end tangent vectors are $x'(0)=\lambda e_0$ and $x'(1)=\mu e_1$, where $\lambda$ and $\mu$ are positive real numbers and $e_0$ and $e_1$ are vectors of length 1. The start and end curvatures are $k_0$ and $k_1$.

Then $$b_0 = a_0$$
$$b_1 = \frac{\lambda}{3} e_0 + a_0$$
$$b_2 = a_1 - \frac{\mu}{3} e_1$$
$$b_3 = a_1.$$

If the curve is a straight line, then $e_0=e_1$, and $$\lambda=\mu=|a_1-a_0|,$$

which implies $x(t)=a_0+t(a_1-a_0)$. If the curve is not straight, there are 5 cases with the following assumptions:

1) If $k_0=0$ and $k_1=0$, assume that $\text{sign}(e_0 \times (a_1-a_0))=\text{sign}(e_1 \times (a_0-a_1))=\text{sign}(e_0 \times e_1) \neq 0$.

2) If $k_0 \neq 0$ and $k_1=0$, assume that $\text{sign}(k_0)=\text{sign}(e_0 \times (a_1-a_0))=\text{sign}(e_1 \times (a_0-a_1))=\text{sign}(e_0 \times e_1)$, and assume that $$|k_0| < \frac{2(e_0 \times e_1)^2 |e_0 \times (a_1-a_0)|}{3(e_1 \times (a_0-a_1))^2}$$

3) If $k_0=0$ and $k_1 \neq 0$, assume that $\text{sign}(k_1)=\text{sign}(e_0 \times (a_1-a_0))=\text{sign}(e_1 \times (a_0-a_1))=\text{sign}(e_0 \times e_1)$, and assume that $$|k_1| < \frac{2(e_0 \times e_1)^2 |e_1 \times (a_0-a_1)|}{3(e_0 \times (a_1-a_0))^2}$$

4) If $k_0 \neq 0$ and $k_1 \neq 0$, and $e_0 \times e_1 = 0$, assume that $\text{sign}(k_0)=\text{sign}(k_1)=\text{sign}(e_0 \times (a_1-a_0))=\text{sign}(e_1 \times (a_0-a_1))$.

5) If $k_0 \neq 0$ and $k_1 \neq 0$, and $e_0 \times e_1 \neq 0$, assume that $\text{sign}(k_0)=\text{sign}(k_1)=\text{sign}(e_0 \times (a_1-a_0))=\text{sign}(e_1 \times (a_0-a_1))$, and if $\text{sign}(k_0)=\text{sign}(e_0 \times e_1)$, assume that either $$|k_0| < \frac{2(e_0 \times e_1)^2 |e_0 \times (a_1-a_0)|}{3(e_1 \times (a_0-a_1))^2}$$

$$|k_1| < \frac{2(e_0 \times e_1)^2 |e_1 \times (a_0-a_1)|}{3(e_0 \times (a_1-a_0))^2}$$

or

-continued $$|k_0| > \frac{2(e_0 \times e_1)^2 |e_0 \times (a_1 - a_0)|}{3(e_1 \times (a_0 - a_1))^2}$$

$$|k_1| > \frac{2(e_0 \times e_1)^2 |e_1 \times (a_0 - a_1)|}{3(e_0 \times (a_1 - a_0))^2}.$$

Let it be mentioned that for peak-point curves, and also for point-point curves, point-tangent curves, and point curves, the assumption that $sign(e_0 \times (a_1-a_0))=sign(e_1 \times (a_0-a_1))$ is for the purpose of avoiding that the Bezier curve has an inflection point, but the assumption is only a sufficient assumption not a necessary assumption.

The following formulas are provided for the five cases above:

1) For $\lambda$ and $\mu$ $$\lambda = \frac{3e_1 \times (a_0 - a_1)}{e_0 \times e_1}$$

$$\mu = \frac{3e_0 \times (a_1 - a_0)}{e_0 \times e_1}$$

2) For $\lambda$ and $\mu$ $$\lambda = \frac{3e_1 \times (a_0 - a_1)}{e_0 \times e_1}$$

$$\mu = \frac{3e_0 \times (a_1 - a_0)}{e_0 \times e_1} - k_0 \frac{9(e_1 \times (a_0 - a_1))^2}{2(e_0 \times e_1)^3}.$$

3) For $\lambda$ and $\mu$ $$\lambda = \frac{3e_1 \times (a_0 - a_1)}{e_0 \times e_1} - k_1 \frac{9(e_0 \times (a_1 - a_0))^2}{2(e_0 \times e_1)^3}$$

$$\mu = \frac{3e_0 \times (a_1 - a_0)}{e_0 \times e_1}.$$

4) For $\lambda$ and $\mu$ $$\lambda = \sqrt{\frac{6e_0 \times (a_1 - a_0)}{k_0}}$$

$$\mu = \sqrt{\frac{6e_1 \times (a_0 - a_1)}{k_1}}.$$

5) For $\lambda$ and $\mu$ the system of equations $$f(\lambda, \mu) = k_0 \lambda^2 + 2e_0 \times e_1 \mu - 6e_0 \times (a_1 - a_0) = 0$$

$$g(\lambda, \mu) = k_1 \mu^2 + 2e_0 \times e_1 \lambda - 6e_1 \times (a_0 - a_1) = 0.$$

For case 5) there are the following solutions:

Let the Jacobian $$J(\lambda, \mu) = \begin{pmatrix} \partial f / \partial \lambda & \partial f / \partial \mu \\ \partial g / \partial \lambda & \partial g / \partial \mu \end{pmatrix} = \begin{pmatrix} 2k_0 \lambda & 2e_0 \times e_1 \\ 2e_0 \times e_1 & 2k_1 \mu \end{pmatrix}$$

have a determinant unequal to 0 at the iterated solutions above. If $sign(k_0)=sign(e_0 \times e_1)$, the following $$\begin{pmatrix} \lambda_0 \\ \mu_0 \end{pmatrix} = \begin{pmatrix} \sqrt{(3e_0 \times (a_1 - a_0))/k_0} \\ \sqrt{(3e_1 \times (a_0 - a_1))/k_1} \end{pmatrix}$$

is taken as an initial solution. If $sign(k_0)=sign(e_0 \times e_1)$, the following $$\begin{pmatrix} \lambda_0 \\ \mu_0 \end{pmatrix} = \begin{pmatrix} \sqrt{(12e_0 \times (a_1 - a_0))/k_0} \\ \sqrt{(12e_1 \times (a_0 - a_1))/k_1} \end{pmatrix}$$

is taken as an initial solution. The system of equations for $(\lambda, \mu)$ is solved through Newton's iteration method $$\begin{pmatrix} \lambda_{i+1} \\ \mu_{i+1} \end{pmatrix} = \begin{pmatrix} \lambda_i \\ \mu_i \end{pmatrix} - J(\lambda_i, \mu_i)^{-1} \begin{pmatrix} f(\lambda_i, \mu_i) \\ g(\lambda_i, \mu_i) \end{pmatrix},$$

where $$J(\lambda_i, \mu_i)^{-1} = \frac{1}{2(k_0 k_1 \lambda_i \mu_i - (e_0 \times e_1)^2)} \begin{pmatrix} k_1 \mu_i & -e_0 \times e_1 \\ -e_0 \times e_1 & k_0 \lambda_i \end{pmatrix}.$$

FIGS. 36–38—Straight Line Segments

A straight line segment may be drawn as a curve component of a curve. To draw it for example the shift key is held down when the end point is set for any of the types of curve component (or when the peak point is set if the curve is a point-point curve). Let the straight line segment be the first curve component. In a first step shown in FIG. 36, a start point $a_0$ and a start tangent direction $e_0$ are set. Start tangent direction $e_0$ is set in the direction of the desired line. In a second step shown in FIG. 37, an end point $a_1$ is set along start tangent direction $e_0$, e.g., by holding the shift key down. Since placing a cursor (not shown) exactly along the start tangent direction $e_0$ is difficult, end point $a_1$ is projected automatically from the cursor onto the half line corresponding to the start tangent direction $e_0$. A straight line segment $c_1$ is automatically drawn between start point $a_0$ and end point $a_1$. As shown in FIG. 38, an end tangent direction $e_1$ is automatically set in alignment with line $c_1$, but no peak point is set.

This straight line segment $c_1$ is already drawn when the mouse button is pressed for the end point $a_1$, and when the mouse is dragged, the end point $a_1$ is dragged to a new position along the start tangent direction $e_0$, and the straight line segment $c_1$ is changed, the final shape of which is drawn when the mouse is released.

If the straight line segment is the nth curve component after the first curve component and is connected with $G^2$ or $G^1$ continuity, only the end point an has to be set along the start tangent direction $e_{n-1}$ (the end tangent direction of the previous curve component). In the case of $G^2$ continuity, the end curvature of the previous curve component has to be 0. A straight line segment $c_n$ is automatically drawn between point $a_{n-1}$ (the end point of the previous curve component) and point $a_n$. An end tangent direction $e_n$ is automatically set in alignment with line $c_n$. If the straight line segment is connected with $G^0$ continuity, also the start tangent direction $e_{n-1}'$ has to be set before setting the end point an along the start tangent direction $e_{n-1}'$.

FIGS. 39–41—Circular Arcs

A circular arc may be drawn as a curve component of a curve. To draw it for example the control key is held down when the end point is set for any of the types of curve component (or when the peak point is set if the curve component is a point-point curve). Let the circular arc be the first curve component. In a fist step shown in FIG. 39, a start point $a_0$ and a start tangent direction $e_0$ are set. In a second step shown in FIG. 40, an end point $a_1$ is set. A circular arc $c_1$ is automatically drawn between start point $a_0$ and end point $a_1$, tangent to $e_0$. As shown in FIG. 41, an end tangent direction $e_1$ is automatically set. If the curve component with which the circle was drawn is a peak-point curve, a point-point curve, a point-tangent or a point curve, a peak point $p_1$ is also automatically set. If the curve component with which the circle was drawn is a curvature curve, centers $m_0$ and $m_1$ of start and end curvature circles (which coincide) are also automatically set. The circular arc is symmetric with respect to the axis that is perpendicular to the chord and goes through the center of the chord and the peak point $p_1$ and the curvature center $m_0$ lie on this axis.

This circular arc $c_1$ is already drawn when the mouse button is pressed for the end point $a_1$, and when the mouse is dragged, the end point $a_1$ is dragged to a new position, and the circular arc $c_1$ is changed, the final shape of which is drawn when the mouse is released.

If the circular arc is the nth curve component after the first curve component and is connected with $G^2$ continuity, only the end point $a_n$ has to be set. Because of $G^2$ continuity, the circular arc has to be part of the end curvature circle of the previous curve component. Since placing the cursor (not shown) exactly onto this curvature circle is difficult, end point an is projected automatically from the cursor onto this curvature circle by being projected towards the center of this curvature circle. The circular arc is automatically drawn between point $a_{n-1}$ (the end point of the previous curve component) and point $a_n$ as part of the end curvature circle of the previous curve component and the center $m_n$ of the end curvature circle of the circular arc equals the center $m_{n-1}$ of the end curvature circle of the previous curve component. If the circular arc is connected with $G^1$ continuity, also only the end point $a_n$ has to be set. A circular arc is automatically drawn between point $a_{n-1}$ (the end point of the previous curve component) and point an, tangent to $e_{n-1}$ (the end tangent direction of the previous curve component). An end tangent direction $e_n$ and a peak point $p_n$ or centers $m_{n-1}$ and $m_n$ of the start and end curvature circles (which coincide) are automatically set. If the circular arc is connected with $G^0$ continuity, also the start tangent direction $e_{n-1}'$ has to be set before setting the end point $a_n$, and the circular arc $c_n$ is tangent to $e_{n-1}'$.

It is possible to change a circular arc into a cubic Bezier curve by for example first selecting a button for "selections" and then selecting the end point while holding the "escape" key down. If the start or end point of the circular arc is connected with $G^2$ continuity, a curvature curve is computed with the start and end points, the start and end tangent directions of the circular arc, and the start and end curvatures equal to the curvature of the circular arc. Otherwise a peak-point curve is computed with the start and end points, the start and end tangent directions, and the peak point of the circular arc.

Also, it is possible to change any curve component (that is not a straight line segment) that is a peak-point curve, a point-point curve, a point-tangent curve, or a point curve into a circular arc by for example first selecting a button for "selections" and then selecting the end point while holding the "escape" key down. For a peak-point curve or a point-tangent curve this changes the end tangent direction and the peak point of the curve component, but the start and end points, and the start tangent direction remain unchanged. For a point-point curve or a point curve this only changes the peak point of the curve component, because the end tangent direction of a circular arc is also symmetric (i.e. the angle between the chord vector and the end tangent direction equals the angle between the start tangent direction and the chord vector).

Continuity of Curve Components

In one embodiment, when drawing curves, all curve components except curvature curve components always connect with $G^1$ continuity by default. If the user wishes to connect a curve component with $G^0$ continuity, a button for $G^0$ continuity has to be selected first. In the same embodiment, when drawing curves, curvature curve components are always connected with $G^2$ continuity by default. If the user wishes to connect a curvature curve component by $G^1$ or $G^0$ continuity, a button for $G^1$ continuity or $G^0$ continuity has to be selected first. Curvature curves are the only curve components which can be connected with $G^2$ continuity.

The continuity how two curve components connect can be changed. To change $G^1$ continuity into $G^0$ continuity at an anchor point, the tangent direction at the anchor point can be split into two tangent directions by for example holding the "1" key down and selecting and changing the end tangent direction (or holding the "2" key down and selecting and changing the start tangent direction) at the anchor point. To change $G^0$ continuity into $G^1$ continuity, two split tangents are made one tangent by for example holding the "3" key down and selecting the tangent the user wants to keep.

To change $G^2$ continuity into $G^1$ continuity at an anchor point, the curvature at the anchor point can be split into two curvatures by for example holding the "1" key down and selecting and changing the center of the end curvature circle (or holding the "2" key down and selecting and changing the center of the start curvature circle) at the anchor point. To change $G^1$ continuity into $G^2$ continuity, two split curvatures can be made one curvature by for example holding the "3" key down and selecting the curvature one wants to keep.

The user can even change $G^0$ continuity into total discontinuity, because a curve can be split by for example first selecting the button for "moving", then holding the "1" key down and selecting and moving the curve ending at a selected anchor point (or holding the "2" key down and selecting and moving the curve starting at a selected anchor point). This splits the curve and keeps the moved curve selected, while it deselects the other curve. Also two separate curves can be made one curve by for example first selecting the button for "moving", then holding the "3" key down and selecting and moving a curve from a selected start point close to an end point of another curve (or selecting and moving a curve from a selected end point close to a start point of another curve), and the two curves connect with $G^0$ continuity.

While drawing a curve (or after selecting it after for example selecting a button for "selections"), the last curve component can be deleted by for example pressing the "delete" or "back-space" key. If the "delete" key is pressed again, the second to the last curve component of the original curve is deleted, and then the third to the last curve component, and so on. If, after deleting one or more curve components, the user wants to continue drawing the curve, a button for the "curve type" has to be selected first.

Now, because it is possible to make two curves out of one curve, and one curve out of two curves, and because it is possible to change the continuity how two curve components connect, the user can delete and redraw not only the last curve component, but any curve component. To do that for a curve component which is not the last curve component, the user first splits the curve at the end point of the chosen curve component, then deletes that curve component, then redraws that curve component, then again makes one curve out of the two curves, which connects them with $G^0$ continuity, and then changes the continuity to $G^1$ continuity is desired, and last changes the continuity to $G^2$ continuity if desired.

Modifying Features and Types of Curve Components

In one embodiment for selecting a feature a mouse, or other input device is used. While drawing a curve, if some features are already drawn for the construction of the next curve component, which has not been drawn yet, any such feature can be deleted by pressing the "delete" key (starting with the last feature drawn, proceeding with the second the last feature, and so on, and the position of any such feature can be changed by for example first selecting a button for "selections" and then selecting the feature.

While drawing a curve (or after selecting it after selecting a button for "selections"), the position of any feature of a curve component that has been drawn can also be changed by for example first selecting a button for "selections" and then selecting the feature. When the feature changes, the curve changes, because the system automatically adapts the shape of the curve to the changed feature.

Each curve component is identified as a curve component of a particular type, and when the position of a feature of the curve component is changed, the curve component changes as a curve component of that type. However, although there are 7 different constructions of curve components, there are only 5 types of curve components remaining by which a curve component is identified for the purpose of making changes: peak-point curves, point-tangent curves, curvature curves, straight line segments, and circular arcs. A curve component that was constructed as a straight line segment or as a circular arc always is identified as a curve component of the same type. A curve component that was constructed as a peak-point curve or as a point-point curve always is identified as a peak-point curve unless it is specifically made a point-tangent curve as described below. A curve component that was constructed as a point-tangent curve or as a point curve is identified as a point-tangent curve as long as the peak point has not been changed, but as soon as the peak point has been changed for the first time, it is identified as a peak-point curve. A curve component that was constructed as a curvature curve only is identified as a curvature curve as long as it is connected with $G^2$ continuity at the start or end point, otherwise it is identified as a peak-point curve.

However, it is possible to change a curve component that is identified as a peak-point curve into a point-tangent curve by for example holding the "escape" key down and selecting the peak point. This computes automatically the point-tangent curve with the same start and end points and the same start and end tangents, and the peak point is changed to the peak point of the point-tangent curve (which is computed as a quadratic Bezier curve). It is also possible to change a point-tangent curve into a peak-point curve by slightly changing the position of the peak point.

When the position of a feature is changed, the type of continuity by which the curve component is connected at the start and end points remains the same. The type of features that can be changed for a curve component depend on the type of the curve component. For a straight line segment only the start or end points, or start or end tangent directions can be changed. For a circle, the start or end point, or start or end tangent directions, and curvature can be changed, and if it is not connected with $G^2$ continuity at the start and end points, the peak point can be changed. For a curve component of the type of a curvature curve only the start or end point, the start or end tangent direction, or the start and end curvature can be changed. (The peak point cannot be changed, because this would interfere with the $G^2$ continuity.) For a curve component of the type of a peak-point curve or point-tangent curve, all features can be changed: the start and end points, the start and end tangent directions, the start and end curvatures, and the peak point. However, the start and end curvatures are not shown unless a special key is held down such as the "c" key. If the "c" key is held down, the curve component changes as a curvature curve (which means that the start and end curvatures can be changed, and also that changes for the start or end points or start or end tangent directions produce a different change in the curve component than if the "c" key is not held down).

If the "c" key is not held down, the curve component changes as a peak-point curve or a point-tangent curve. If the curve component changes as a point-tangent curve, the peak point gets changed automatically, when the start point, end point, start tangent direction, or end tangent direction is changed (because the quadratic Bezier curve is changed, which gives a new peak point). This gives more flexibility for those changes, whereas for peak-point curves, since the peak point does not get changed with those changes, there is less flexibility.

If a curve component is a straight line segment, it responds differently when a feature gets changed than if the curve component is a Bezier curve, because when one feature is changed, other features are changed also automatically. When the position of the start or end point is changed, both tangent directions are changed automatically, but the other point remains unchanged. When the position of the start or end tangent direction is changed, the other point and other tangent direction are changed automatically, but the corresponding point and the length of the straight line segment remain unchanged.

If a curve component is a circular arc, it responds differently when a feature gets changed than if the curve component is a Bezier curve, because when one feature is changed, other features are changed also automatically. When the position of the start or end point is changed, the corresponding tangent direction and the peak point are changed automatically, but the other point and tangent direction remain unchanged. When the position of the start or end tangent direction is changed, the other point and tangent direction and the peak point are changed automatically, but the corresponding point remains unchanged. When the position of the peak point is changed, the start and end tangent directions are changed, but the start and end points remain unchanged.

If the curve component is not a point-tangent curve, not a straight line segment, and not a circular arc, when any feature of the curve component is changed, only that feature is changed and the other features of the curve component remain unchanged. Also when the peak point of a point-tangent curve is changed, the other features remain unchanged.

If the feature is a peak point, no other curve component gets changed. However if the feature is an anchor point, both curve components which connect at that anchor point are changed. If the feature is a tangent direction at an anchor point, and if the curve components are connected with $G^1$ or $G^2$ continuity at that anchor point, both curve components are changed, but if they are connected with $G^0$ continuity, only the curve component of the selected tangent direction is changed. If the feature is a curvature at an anchor point, and if the curve components are connected with $G^2$ continuity at that anchor point, both curve components are changed, but if they are connected with $G^1$ or $G^0$ continuity only the curve component of the selected curvature is changed.

Adding and Subtracting Curve Components

For a general curve, that is composed of curve components of any curve-type, curve components can be added or subtracted with any suitable method. A curve component can be added by for example first selecting a button for "additions" and then selecting a point on the curve between a start and an end point of a curve component. Then this curve component becomes two curve components which connect at this point. If the original curve component is a Bezier curve, the two curve components are simply portions of this Bezier curve, which are reparametereized so that the parameter interval is [0, 1]. If the original curve component is a circular arc, the two curve components are portions of this circular arc and have the same radius. In both cases the selected point and tangent direction is shown. If the original curve component is of the type of a peak-point curve or point-tangent curve the peak points of the two curve components are shown. To compute the peak point of a cubic Bezier curve $x(t)$ with start and end points $a_0$ and $a_1$, the following quadratic equation for the parameter t of the peak point is solved:

$$x'(t) \times (a_1 - a_0) = 0,$$

where "x" denotes the vector product between two 2-dimensional vectors. If the original curve component is of the type of a curvature curve, the center of the curvature circle at the selected point is shown together with the curvature line, and the curvature lines at the start and end points of the curve component are adjusted.

For a general curve, that is composed of curve components of any curve-type, curve components can also be subtracted by for example first selecting a button for "subtractions" and then selecting an anchor point on the curve. Then the two curve components which connect at that anchor point become one curve component. If neither of the two curve components is of the type of a curvature curve, the one curve component is computed as a peak-point curve which has the same start point $a_0$ and the same start tangent direction as the start point and the start tangent direction of the first curve component and the same end point $a_1$ and the same end tangent direction as the end point and end tangent direction of the second curve component and the peak point equals the point on one of the two curve components which is tangent to a1-a0. In general, to compute the point on a cubic Bezier curve $x(t)$ that is tangent to a given vector v, the following quadratic equation for the parameter t of the point is solved:

$$x'(t) \times v = 0,$$

where "x" denotes the vector product between two 2-dimensional vectors. If at least one of the two curve components is of the type of a curvature curve, the one curve component is computed as a curvature curve which has the same start point, the same start tangent direction, and the same start curvature as the start point, the start tangent direction, and the curvature of the first curve component and the same end point, the same end tangent direction, and the same end curvature as the end point, end tangent direction, and end curvature of the second curve component.

The additions always work, but, in one embodiment, the subtractions do not work if the assumptions described above for computing the peak-point curve or the curvature curve are not fulfilled.

Computing Points and Tangent Directions of a Quadratic Bezier Curve

Let $b_0$, $b_1$, and $b_2$ be the control points of a quadratic Bezier curve. For drawing a quadratic Bezier curve or for selecting a point on a quadratic Bezier curve the deCasteljau algorithm with respect to parameter 1/2 is used. This algorithm is faster than making computations using the equation of the quadratic Bezier curve. It computes a number N of points and tangent directions, the number N being a power of 2 (such as N=1024). For drawing the quadratic Bezier curve, the polygonal line connecting these points is drawn. The points are not computed in the order they are drawn, but each point has an index and the points are drawn in the order of the indices. The points $p[n]$, $n=0, 1, 2, \ldots, N$, start at the start point $p[0]=b_0$ and end at the end point $p[N]=b_2$. The tangent directions $t[n]$, $n=0, 1, 2, \ldots, N$, start at the start tangent direction $t[0]$=vector from $b_0$ to $b_1$, and end at the end tangent direction $t[N]$=vector from $b_1$ to $b_2$. The points $p[n]$ and tangent directions $t[n]$, $n=1, 2, 3, \ldots, N-1$ are computed by a recursive function depending on an index n, a step s, and control points $c_0$, $c_1$, and $c_2$ (for a quadratic Bezier curve which is a portion of the original quadratic Bezier curve). This recursive function also depends on the arrays $p[\ ]$ and $t[\ ]$, where it writes the results. The first time this function is called for the index N/2, the step N/2, and the control points $c_0=b_0$, $c_1=b_1$, and $c_2=b_2$, and it computes the point $p[N/2]$ and the tangent direction $t[N/2]$. When the function is called for the index n it computes the point $$p[n] = 0.5*(0.5*(c_0+c_1)+0.5*(c_1+c_2))$$

and the tangent direction $$t[n] = \text{vector from } 0.5*(c_0+c_1) \text{ to } 0.5*(c_1+c_2).$$

After $p[n]$ and $t[n]$ are computed, if s is still larger than 1, the recursive function gets called twice for the index n−s/2, the step s/2, and the control points $$c_0, 0.5*(c_0+c_1), \text{ and } p[n]$$

(for the quadratic Bezier curve between $c_0$ and $p[n]$), and for the index n+s/2, the step s/2, and the control points $$p[n], 0.5*(c_1+c_2), \text{ and } c_2$$

(for the quadratic Bezier curve between $p[n]$ and $c_2$).

The point $p[n]$ and tangent direction $t[n]$ are the point and tangent direction at the parameter $t=n/N$, and they are computed faster than using the equation of the original Bezier curve.

Computing Points and Tangent Directions of a Cubic Bezier Curve

Let $b_0$, $b_1$, $b_2$, and $b_3$ be the control points of a cubic Bezier curve. For drawing a cubic Bezier curve or for selecting a point on a cubic Bezier curve the deCasteljau algorithm with respect to parameter 1/2 is used. This algorithm is faster than making computations using the equation of the cubic Bezier curve. It computes a number N of points and tangent directions, the number N being a power of 2 (such as N=1024). For drawing the cubic Bezier curve, the polygonal line connecting these points is drawn. The points are not computed in the order they are drawn, but each point has an index and the points are drawn in the order of the indices. The points $p[n]$, $n=0, 1, 2, \ldots, N$, start at the start point $p[0]=b_0$ and end at the end point $p[N]=b_3$. The tangent directions $t[n]$, $n=0, 1, 2, \ldots, N$, start at the start tangent direction $t[0]$=vector from $b_0$ to $b_1$ and end at the end tangent direction $t[N]$=vector from $b_2$ to $b_3$. The points $p[n]$ and tangent directions t[n], n=1, 2, 3, ..., N−1 are computed by a recursive function depending on an index n, a step s, and control points $c_0$, $c_1$, $c_2$, and $c_3$ (for a cubic Bezier curve which is a portion of the original cubic Bezier curve). This recursive function also depends on the arrays p[ ] and t[ ], where it writes the results. The first time this function is called for the index N/2, the step N/2, and the control points $c_0=b_0$, $c_1=b_1$, $c_2=b_2$, and $c_3=b_3$, and it computes the point p[N/2] and the tangent direction t[N/2]. When the function is called for the index n it computes the point $$p[n]=0.5*(0.5*(0.5*(c_0+c_1)+0.5*(c_1+c_2))+0.5*(0.5*(c_1+c_2)+0.5*(c_2+c_3)))$$

and the tangent direction $$t[n]=\text{vector from } 0.5*(0.5*(c_0+c_1)+0.5*(c_1+c_2)) \text{ to } 0.5*(0.5*(c_1+c_2)+0.5*(c_2+c_3)).$$

After p[n] and t[n] are computed, if s is still larger than 1, the recursive function calls itself twice for the index n−s/2, the step s/2, and the control points $$c_0, 0.5*(c_0+c_1), 0.5*(0.5*(c_0+c_1)+0.5*(c_1+c_2)), \text{ and } p[n]$$

(for the cubic Bezier curve between $c_0$ and p[n]), and for the index n+s/2, the step s/2, and the control points $$p[n], 0.5*(0.5*(c_1+c_2)+0.5*(c_2+c_3)), 0.5*(c_2+c_3), \text{ and } c_3$$

(for the cubic Bezier curve between p[n] and $c_3$).

The point p[n] and tangent direction t[n] are the point and tangent direction at the parameter t=n/N, and they are computed faster than using the equation of the original Bezier curve.

Conclusion

Although the above description is specific, it should not be considered as a limitation on the scope of the invention, but only as an example of the preferred embodiment. Many substitutes and variations are possible within the teachings of the invention. The mathematical formulas are only examples how the curves may be determined; any other suitable formulas may be used. The order in which the points, tangent directions, and peak points are set may be different.

In one embodiment, for all curves, peak-point curves, point-point curves, point-tangent curves, and point curves, each curve component is curved in only one direction, i.e., it has no inflection point. In this embodiment an inflection point must be constructed explicitly by connecting two curve components that are curved in opposite directions, e.g., in FIG. 11, FIG. 18, FIG. 23, and FIG. 28 the point $a_1$ is an inflection point.

In one embodiment, any feature that is drawn—be it a point, a tangent direction, or a peak point—is shown immediately while the mouse button is pressed. However, if the feature cannot be drawn because of the assumptions in the embodiment (such as the assumptions described above together with the formulas), it is not drawn, and the cursor has to be positioned somewhere else where the feature can be drawn. There might be less freedom how a feature can be positioned than in a typical computer drawing program, however there is more control how the features determine the curve.

While the method and apparatus of the present invention has been described in terms of its presently preferred and alternate embodiments, those skilled in the art will recognize that the present invention may be practiced with modification and alteration within the spirit and scope of the appended claims. The specifications and drawings are, accordingly, to be regarded in an illustrative rather than a restrictive sense. Further, even though only certain embodiments have been described in detail, those having ordinary skill in the art will certainly understand that many modifications of the embodiments are possible without departing from the teachings thereof. All such modifications are intended to be encompassed within the following claims.

I claim:

1. A computer curve construction system for constructing a curve that includes a plurality of curve components that are connected with a certain type of continuity, the system comprising:
   a user input device;
   a display device; and
   a processor coupled to the input device and the display device,
   wherein the processor responds to signals from the input device for generating a curve component from a group of curves consisting of a peak-point curve, a point-point curve, a point-tangent curve, a point curve and a curvature curve and providing output to the display device for displaying each selected curve component,
   the processor being operative to define and provide output for displaying each subsequent curve component after a first curve component connected to a previous curve component with a particular type of continuity in a category consisting of geometric order 0 (G0), geometric order 1 (G1) and geometric order 2 (G2).

2. The computer curve construction system of claim 1, and wherein the class of curve components defined by the processor responsive to signals from the input device further include a circular arc and a straight line.

3. The computer curve construction system of claim 2, and wherein the processor further provides output to the display device for displaying a class of geometric constraints for each selected curve component consisting of:
   (a) a start point, a start tangent direction at the start point, an end point, and an end tangent direction at the end point;
   (b) where the selected curve component is in a subclass consisting of a peak-point curve, a point-point curve, a point curve, and a circular arc, a peak point having a tangent direction parallel a chord connecting the start point and end point; and
   (c) where the selected curve component is a curvature curve, a start curvature at the start point, and an end curvature at the end point.

4. The computer curve construction system of claim 3, and wherein the processor responds to modification signals provided by the input device for modifying particular geometric constraints defining a selected curve component to the particular geometric constraints defining a type of curve in a subgroup consisting of a peak point curve, a point tangent curve, a curvature curve, a circular arc and a straight line.

5. The computer curve construction system of claim 3, wherein the processor provides output to the display device for:
   (i) displaying the start point of each subsequent curve component as the end point of the previous curve component for a connection of geometric continuity order 0 (G0); and
   (ii) displaying the start point and the start tangent direction of each subsequent curve component as the end point and the end tangent direction of the previous curve component for a connection of geometric continuity order 1 (G1); and (iii) displaying the start point, the start tangent direction and the start curvature of each subsequent curve component as the end point, the end tangent direction and the end curvature of the previous curve component for a connection of geometric continuity order 2 (G2).

6. The computer curve construction system of claim 5, and wherein the processor responds to modification signals provided by the input device for modifying the continuity between any two selected curve components.

7. A computer curve construction method for constructing a curve that includes a plurality of connected curve components that are connected with a certain type of continuity, the method comprising:

generating each curve component from a group of curves consisting of a peak-point curve, a point-point curve, a point-tangent curve, a point curve and a curvature curve;

displaying the selected curve component; and connecting each subsequent curve component after a first curve component to a previous curve component with a particular type of continuity in a category consisting of geometric order 0 (G0), geometric order 1 (G1) and geometric order 2 (G2).

8. The computer curve construction method of claim 7, wherein the group of curve components for selection and display further include a circular arc and a straight line.

9. The computer curve construction method of claim 8 wherein the step of displaying each selected curve component includes display of a class of geometric constraints for each selected curve component consisting of:

(a) a start point, a start tangent direction at the start point, an end points, and an end point tangent direction at the end point;

(b) where the selected curve component is in a subclass consisting of a peak-point curve, a point-point curve, a point curve, and a circular arc, a peak point having a tangent direction parallel to a chord connecting the start and end points;

(c) where the selected curve component is a curvature curve, a start curvature at the start point, and an end curvature at the end points.

10. The computer curve construction method of claim 9, and further comprising:

modifying geometric particular geometric constraints defining a selected curve component to the particular geometric constraints defining a type of curve in a subgroup consisting of a peak point curve, a point tangent curve, a curvature curve, a circular arc and a straight line.

11. The computer curve construction method of claim 9 and further including the steps of:

(i) displaying the start point of each subsequent curve component as the end point of the previous curve component for a connection of geometric continuity order 0 (G0); and (ii) displaying the start point and the start tangent direction of each subsequent curve component as the end point and the end tangent direction of the previous curve component for a connection of geometric continuity order 1 (G1); and (iii) displaying the start point, the start tangent direction and the start curvature of each subsequent curve component as the end point, the end tangent direction and the end curvature of the previous curve component for a connection of geometric continuity order 2 (G2).

12. The computer curve construction method of claim 11, and further comprising:

modifying the continuity between any two selected curve components.

13. A computer curve construction system for constructing peak-point curves, the system comprising:

an input device; and a processor coupled to the input device, and wherein the processor responds to signals received from the input device for:

selecting a start point, selecting a start tangent direction at the start point, selecting an end point spaced from the start point, selecting an end tangent direction at the end point and selecting a peak point spaced from the start point and the end point, calculating a chord connecting the start point to the end point, the processor being operative to generate a first curve component between the start point and the end point and passing through the peak point having a tangent direction parallel to the chord connecting between the start point and the end point, the curve component being defined by a mathematical formula using the start point, the start tangent direction, the end point, the end tangent direction, the peak point and the peak point tangent direction as variables.

14. The computer curve construction system of claim 13, and wherein the mathematical formula defines a cubic Bezier curve.

15. A computer curve construction method for constructing a peak-point curve, the method comprising:

selecting a start point;

selecting a start tangent direction at the start point;

selecting an end point spaced from the start point;

selecting an end tangent direction at the end point;

calculating a direction of a chord connecting the start point and the end point;

selecting a peak point spaced from the start point and the end point; and calculating a peak point tangent direction at the peak point parallel to the chord; generating a curve between the start point and the end point and passing through the peak point having a tangent direction parallel to that of the chord, the curve being defined by a mathematical formula using the start point, the start tangent direction, the end point, the end tangent direction, the peak point and the peak point tangent direction as variables.

16. The computer curve construction method of claim 15, and wherein the mathematical formula defines a cubic Bezier curve.

17. A computer curve construction system for constructing point-point curves, the system comprising:

an input device; and a processor coupled to the input device responding to signals received from the input device for:

selecting a start point;

selecting a start tangent direction;

selecting an end point; and selecting a peak point between the start point and the end point, the processor calculating a chord vector connecting the start point and the end point; calculating an angle $\alpha$ between the start tangent direction and the chord vector; setting an end tangent direction at the end point intersecting the chord vector at angle β having a pre-selected relationship with angle α, and setting a peak point tangent direction at the peak point parallel to the chord vector, the processor being operative to generate a first curve between the start point and the end point and passing through the peak point, the curve being defined by a mathematical formula using the start point, the start tangent direction, the end point, the peak point and the peak point tangent direction as variables.

18. The computer curve construction system of claim 17, and wherein the mathematical formula defines a cubic Bezier curve.

19. The computer curve construction system of claim 17 wherein the mathematical formula defines a quadratic Bezier curve.

20. A computer curve construction method for constructing point-point curves, the method comprising:

selecting a start point;

selecting a start tangent direction at the start point;

selecting an end point spaced from the start point;

selecting a peak point spaced from the start point and from the end point;

calculating a chord vector connecting the start point and the end point;

calculating an angle a between the start tangent direction and the chord vector;

setting an end tangent direction at the end point intersecting the chord vector at angle β where angle β has a pre-selected relationship with angle α;

setting a peak point tangent direction at the peak point parallel to the chord vector; and generating a curve between the start point, the peak point and the end point, the curve being defined by a mathematical formula using the start point, the start tangent direction, the end point, the peak point and the peak point tangent direction as variables.

21. The computer curve construction method of claim 20 wherein the mathematical formula defines a cubic Bezier curve.

22. A computer curve construction system, comprising:

an input device; and a processor coupled to the input device, wherein the processor responds to signals received from the input device for:
   selecting a start point;
   establishing a start tangent direction;
   selecting an end point;

the processor:
   calculating a chord between the start point and the end point;
   calculating an angle α between the start tangent direction and the chord;
   setting an end tangent direction at the end point at an angle β related to angle α, and
   calculating a peak point having a tangent direction parallel to the chord located on a line bisecting the chord and extending through a vertex point defined by an intersection of a first ray aligned with the start tangent direction and a second ray aligned with the end tangent direction, the processor being operative to generate a first curve defined by a mathematical formula between the start point and the end point and passing through the peak point using the start point, the start tangent direction, the end point, the end tangent direction, the peak point and the peak point tangent direction as variables.

23. The computer curve construction system of claim 22, and wherein the mathematical formula defines a quadratic Bezier curve.

24. A computer curve construction method for constructing a curve, the method comprising:

selecting a start point;

selecting a start tangent direction at the start point;

selecting an end point spaced from the start point, calculating a first angle α between the start tangent direction and a chord vector between the start point and the end point;

setting an end tangent direction at the end point at a second angle β to the chord vector related to the first angle α;

locating a peak point having a tangent direction parallel to the chord vector on a line bisecting the chord vector and extending through a vertex point defined by an intersection of a first ray coinciding and aligned with the start tangent direction and a second ray coinciding and aligned with the end tangent direction; and generating a first curve defined by a mathematical formula between the start point and the end point and passing through the peak point using the start point, the start tangent direction, the end point, the end point tangent direction, the peak point and the peak point tangent direction as variables.

25. The computer curve construction method of claim 24 wherein the first angle α between the start tangent direction and the chord vector is smaller than 90 degrees, the second angle β equals first angle α and the mathematical formula defines a quadratic Bezier curve.

26. A computer curve construction method for constructing a curvature curve, the method comprising:

selecting a start point, selecting a start tangent direction at the start point, calculating and displaying a first locus line that includes the start point and is perpendicular to the start tangent direction, selecting a start curvature at the start point by selecting a center of a start curvature circle that includes the start point along the first locus line, selecting an end point spaced from the start point, selecting an end tangent direction at the end point, calculating and displaying a second locus line that is a ray or a line segment on the line that includes the end point and is perpendicular to the end tangent direction, selecting an end curvature at the end point by selecting a center of an end curvature circle that includes the end point along the second locus line, and generating and displaying a first curve component between the start point and the end point, the curve being defined by mathematical formula using the start point, the start tangent direction, the start curvature, the end point, the end tangent direction and the end curvature as variables.

27. The computer curve construction method of claim 26, and wherein the curve comprises a cubic Bezier curve.

28. A computer curve construction system for constructing curvature curves comprising, in combination:

an input device;

a display device for presenting two dimensional representations, and a processor receiving input from the input device, and providing output driving the display device, wherein the processor responds to signals received from the input device for:

selecting a start point,
selecting a start tangent direction at the start point,
specifying a start curvature at the start point,
selecting an end point spaced from the start point,
selecting an end tangent direction at the end point and specifying an end curvature at the end point, wherein the start curvature at the start point is specified by an operator using the input device to establish a start curvature circle that includes the start point by selecting a center with the input device along a first displayed locus line that includes the start point and is perpendicular to the start tangent direction, and wherein the end curvature at the end point is specified by an operator using the input device to establish an end curvature circle that includes the end point by selecting a center with the input device along second displayed locus line segment that includes the end point and is perpendicular to the end tangent direction, the processor being operative to generate and provide output to the display device for displaying a curve between the start point and the end point, the curve being defined by mathematical formula using the start point, the start tangent direction, the start curvature, the end point, the end tangent direction and the end curvature as variables.

29. The computer curve construction system of claim 28 wherein the mathematical formula defines a cubic Bezier curve.

30. A computer curve construction system for constructing curves in a class consisting of a peak-point curve, a point-point curve, a point-tangent curve, and a point curve, comprising, in combination:

an input device;
a display device for presenting two dimensional representations, and
a processor coupled to the input device, wherein the processor responds to signals received from the input device for
selecting a start point $a_0$;
establishing a start tangent direction unit vector $e_0$ at the start point;
selecting an end point $a_1$;
establishing an end tangent direction unit vector $e_1$ at the end point where signature$(e_0 \times (a_1-a_0))$=signature $(e_1 \times (a_0-a_1)) \neq 0$,;

the processor providing output to the display device for indicating a two dimensional region bounded by a first ray coinciding with and extending in the start tangent direction unit vector $e_0$, a chord connecting $a_0$ and $a_1$, and a second ray coinciding with and extending opposite to the end tangent direction unit vector $e_1$, where a computer graphics operator can establish a peak point for the curve having a tangent direction parallel to the chord connecting $a_0$ and $a_1$, the processor providing output to the display device for displaying the curve upon operator establishment of the peak point.

31. The computer curve construction system of claim 30 for constructing point-tangent curves wherein the processor responds to signals received from the input device for establishing the end tangent direction unit vector $e_1$ at the end point where signature$(e_0 \times e_1)$=signature$(e_0 \times (a_1-a_0))$, the processor being operative to generate a first curve between the start point and the end point using a predefined algorithm locating a peak point in the bounded region, the curve being defined by a mathematical formula using the start point, the start tangent direction, the end point and the end tangent direction as variables.

32. The computer curve construction system of claim 31, and wherein the mathematical formula defines a quadratic Bezier curve.

33. The computer curve construction system of claim 30 for constructing point curves, wherein the processor uses a predefined algorithm for:

establishing an end tangent direction unit vector $e_1$ where signature$(e_0 \times e_1)$=signature$(e_0 \times (a_1-a_0))$, and
locating a peak point in the bounded region, the processor being operative to generate a first curve between the start point and the end point, the curve being defined by a mathematical formula using the start point, the start tangent direction and the end point as variables.

34. The computer curve construction system of claim 33 wherein a first angle between the start tangent direction unit vector $e_0$ and chord vector $(a_1-a_0)$ is smaller than 90 degrees, the mathematical formula defines a quadratic Bezier curve and sets a second angle between chord vector $(a_1-a_0)$ and the end tangent direction unit vector $e_1$ equal to the first angle.

35. The curve construction system of claim 30 wherein the operator establishes the peak point in the indicated two dimensional region by selecting a point in that region with the input device, whereby, the curve displayed by the display device is a peak point curve.

36. The curve construction system of claim 30 wherein the operator establishes the peak point in the indicated two dimensional region according to a predefined algorithm specifying geometric constraints for the constructed curve, whereby, the curve displayed by the display device is a point-point curve if the end tangent direction is solely specified by the algorithm as a geometric constraint, a point-tangent curve if the peak point is solely specified by the algorithm as a geometric constraint, and a point curve if both the end tangent direction and the peak point are specified by the algorithm as geometric constraints.

37. A computer curve construction method for constructing curves in a class consisting of a peak-point curve, a point-point curve, a point-tangent, and a point curve comprising the steps of:

a) selecting a start point $a_0$;
b) selecting a start tangent direction unit vector $e_0$ at the start point;
c) selecting an end point $a_1$;
d) establishing an end tangent direction unit vector $e_1$ at the end point where signature$(e_0 \times (a_1-a_0))$=signature $(e_1 \times (a_0-a_1)) \neq 0$;
e) calculating a chord connecting $a_0$ and $a_1$;
f) displaying a two dimensional region bounded by a first ray coinciding and extending with the start tangent direction unit vector $e_0$, a chord connecting $a_0$ and $a_1$, and a second ray coinciding with and extending opposite to the end tangent direction unit vector $e_1$;
g) locating a peak point within the displayed two dimensional region;
h) calculating a peak point tangent direction at the peak point parallel the chord connecting $a_0$ and $a_1$;
i) displaying a first curve between the start point and the end point, passing through the peak point, the curve being defined by a mathematical formula using the start point, the start tangent direction, the end point, the end tangent direction, the peak point and the peak point tangent direction as variables.

38. A computer curve construction method of claim 37 for constructing a point-tangent curve further including the steps of:
  establishing the end tangent direction unit vector $e_1$ at the end point where signature($e_0 \times e_1$)=signature($e_0 \times (a_1-a_0)$));
  using a predefined algorithm for locating a peak point in the bounded region; and generating a curve defined by a mathematical formula between the start point and the end point using the start point, the start tangent direction, the end point and the end tangent direction as variables.

39. The computer curve construction method of claim 38, and wherein the mathematical formula defines a quadratic Bezier curve.

40. The computer curve construction method of claim 37 for constructing a point curve further including the steps of:
  using a predefined algorithm for:
    establishing the end tangent direction unit vector $e_1$ where signature($e_0 \times e_1$)=signature($e_0 \times (a_1-a_0)$), and locating a peak point in the bounded region; and
    generating a curve defined by a mathematical formula between the start point and the end point using the start point, the start tangent direction and the end point as variables.

41. The computer curve construction method of claim 40 wherein the mathematical formula defines a quadratic Bezier curve and further including the steps of:
  (i) setting a first angle between the start tangent direction unit vector $e_0$ and chord vector $(a_1-a_0)$ is smaller than 90 degrees; and
  (ii) setting a second angle between chord vector $(a_1-a_0)$ and the end tangent direction unit vector $e_1$ equal to the first angle.

42. The computer curve construction method of claim 40 wherein the mathematical formula defines a circular arc.

43. The computer curve construction method of claim 37 wherein the peak point is located within the bounded two dimensional region displayed by an operator selecting a point in that region with an input device coupled to processor providing output to a display device, whereby, the curve displayed is a peak point curve.

44. The computer curve construction method of claim 37 wherein the peak point is located within the bounded two dimensional region according to a predefined algorithm specifying geometric constraints for the constructed curve, whereby, the curve displayed by the display device is a point-point curve if the end tangent direction is solely specified by the algorithm as a geometric constraint, a point-tangent curve if the peak point is solely specified by the algorithm as a geometric constraint, and a point curve if both the end tangent direction and the peak point are specified by the algorithm as geometric constraints.

45. A computer curve construction system for constructing a curvature curve, the system comprising:
  an input device,
  a display device for presenting two-dimensional representations, and
  a processor coupled to the input device providing output driving the display device,
wherein the processor responds to selection signals received from the input device specifying and establishing geometric constraints for the constructed cure by
  selecting a start point $a_0$,
  selecting a start tangent direction unit vector $e_0$ at the start point,
  establishing a start curvature $k_0$ at the start point by
    selection of a center of curvature circle on an imaginary locus line that includes the start point and is perpendicular to the start tangent direction indicated by the display device from output of the processor,
  selecting an end point $a_1$,
  selecting an end tangent direction unit vector $e_1$ at the end point where:
    signature($e_0 \times (a_1-a_0)$)=signature($e_1 \times (a_0-a_1)$)$\neq 0$ and
    signature($k_0$)=signature($e_0 \times (a_1-a_0)$) if $k_0 \neq 0$, and
    signature($e_0 \times e_1$)=signature($e_0 \times (a_1-a_0)$) if $k_0 = 0$,
  establishing an end curvature $k_1$ at the end point by
    selection of a center of end curvature circle on an imaginary locus line segment on the line that includes the end point and is perpendicular to the end tangent direction indicated by the display device from output of the processor,
the processor being operative to generate output to the display device for displaying a first curve between the start point and the end point, the curve being defined by a mathematical formula using the selected and established geometric constraints as variables.

46. A computer curve construction method for constructing a curvature curve by selecting and establishing geometric constraints for constructing the method comprising:
  a) selecting a start point $a_0$ with an input device coupled to a CPU processor,
  b) selecting a start tangent direction unit vector $e_0$ at the start point with the input device,
  c) displaying a first imaginary locus line that includes the start point and is perpendicular to the start tangent direction with a display device driven by output from the CPU processor;
  d) establishing a start curvature at the start point by selecting a center of start curvature circle on the displayed first imaginary locus line with the input device;
  e) selecting an end point $a_1$ with the input device,
  f) selecting an end tangent direction unit vector $e_1$ at the end point with the input device where:
    signature($e_0 \times (a_1-a_0)$)=signature($e_1 \times (a_0-a_1)$)$\neq 0$, and
    signature($k_0$)=signature($e_0 \times (a_1-a_0)$) if $k_0 \neq 0$, and
    signature($e_0 \times e_1$)=signature($e_0 \times (a_1-a_0)$) if $k_0 = 0$,
  g) displaying a second imaginary locus line segment that includes the end point and is perpendicular to the end tangent direction with the display device driven by output from the CPU processor;
  h) establishing an end curvature at the end point by selecting a center of end curvature circle on the displayed second imaginary locus line segment with the input device,
  i) displaying a first curve between the start point and the end point with the display device, the curve being generated from output of the CPU processor using a mathematical formula and the selected and established geometric constraints as variables.

47. The computer curve construction system of claim 13, or 17, or 22, and further comprising:
  a display device connected to the processor for displaying the curve.

48. The computer curve construction method of claim 15 or 20, or 24, and further comprising the step of:
  displaying the curve utilizing a display device.

49. The computer curve construction system of claim 13 or 17 or 22 or 31 or 33 or 28 or 30 or 45, and wherein the processor responds to signals received from the input device for:

(a) connecting a second curve with a type geometric continuity in a category consisting of:
- geometric order 0 (G0) where a second start point for the second curve is specified as the end point of the first curve;
- geometric order 1 (G1) where a second start point for the second curve is specified as the end point of the first curve, and a second start tangent direction for the second curve is specified as the end tangent direction of the first curve; and
- geometric order 2 (G2) where a second start point for the second curve is specified as the end point of the first curve, a second start tangent direction for the second curve is specified as the end tangent direction of the first curve, and a second start curvature for the second curve is specified as the end curvature of the first curve;

(b) selecting an end point for the second curve; and (c) selecting the remaining geometric constraints which are used for defining the curve, the processor being further operative to generate the second curve between the end point of the first curve and the end point of the second curve, the second curve being defined by a mathematical formula using the specified and selected geometric constraints.

50. The computer curve construction method of claim 15 or 20, or 24 or 38 or 40 or 26 or 37 or 46, and further including steps (a) connecting a second curve with a type geometric continuity in a category consisting of:
- geometric order 0 (G0) where a second start point for the second curve is specified as the end point of the first curve;
- geometric order 1 (G1) where a second start point for the second curve is specified as the end point of the first curve, and a second start tangent direction for the second curve is specified as the end tangent direction of the first curve; and
- geometric order 2 (G2) where a second start point for the second curve is specified as the end point of the first curve, a second start tangent direction for the second curve is specified as the end tangent direction of the first curve, and a second start curvature for the second curve is specified as the end curvature of the first curve;

(b) selecting an end point for the second curve;

(c) selecting the remaining geometric constraints which are used for defining the curve; and (e) generating the second curve between the end point of the first curve and the end point for the second curve, the second curve being defined by a mathematical formula using the specified and selected geometric constraints.

* * * * *